US006360332B1

(12) United States Patent
Weinberg et al.

(10) Patent No.: US 6,360,332 B1
(45) Date of Patent: Mar. 19, 2002

(54) SOFTWARE SYSTEM AND METHODS FOR TESTING THE FUNCTIONALITY OF A TRANSACTIONAL SERVER

(75) Inventors: Amir Weinberg, Tsoran; Eran Leshem, Gan Shomron; Maxim Kholmyansky, Tel-Aviv; Amos Garri, Modiin; Nisim Tapiro, Letsion, all of (IL); Meni Hillel, San Jose, CA (US)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 09/337,082

(22) Filed: Jun. 21, 1999

Related U.S. Application Data
(60) Provisional application No. 60/090,158, filed on Jun. 22, 1998, and provisional application No. 60/129,172, filed on Apr. 14, 1999.

(51) Int. Cl.[7] ............................. G06F 11/00; G06F 11/36
(52) U.S. Cl. .............................. 714/4; 714/38
(58) Field of Search ............................. 714/4, 38, 33, 714/46, 712; 345/968; 717/1, 4; 707/1, 200, 503, 509; 702/122, 183; 709/203, 224, 252

(56) References Cited

U.S. PATENT DOCUMENTS

| 5,303,166 A | 4/1994 | Amalfitano et al. |
|---|---|---|
| 5,446,874 A | 8/1995 | Waclawsky et al. |
| 5,544,310 A | 8/1996 | Forman et al. |
| 5,596,714 A | 1/1997 | Connell |
| 5,742,754 A | * 4/1998 | Tse |
| 5,787,254 A | 7/1998 | Maddalozzo, Jr. et al. |
| 5,812,780 A | 9/1998 | Chen et al. |
| 5,819,066 A | 10/1998 | Bromberg et al. |
| 5,905,856 A | 5/1999 | Ottensooser |
| 6,006,260 A | 12/1999 | Barrick, Jr. et al. |
| 6,138,112 A | * 10/2000 | Slutz |
| 6,138,157 A | 10/2000 | Welter et al. |

OTHER PUBLICATIONS

Pp. 1–7 213–218 and 300–307 of WinRunner 4.0 User's Guide, dated 1996.

* cited by examiner

*Primary Examiner*—Gopal C. Ray
(74) *Attorney, Agent, or Firm*—Knobbe, Martens, Olson & Bear, LLP

(57) ABSTRACT

A testing tool automatically records a series of user steps taken during a user session with a transactional server and generates a test for testing the functionality of server. Through a user interface of the testing tool, the user can define verification steps to automatically test for expected server responses during test execution. The testing tool displays the test to the user as a tree having nodes (displayed as icons) which represent steps of the test. Via the user interface, the user can modify node properties and perform other types of tree edit operations to edit the test, without the need to know a scripting or other programming language. When the user selects a node that corresponds to a particular field or other object of the server screen, the testing tool automatically displays the screen with the object highlighted. The testing tool also allows the test author to use a spreadsheet to conveniently specify data sets for running multiple iterations of a test; thus, the user can record a single transaction and then automatically test the transaction with other data sets.

23 Claims, 22 Drawing Sheets

| | Material | Order quantity | C | D |
|---|---|---|---|---|
| | A11 | End 4 | | |
| 1 | P-110 | 4 | | |
| 2 | P-220 | 6 | | |
| 3 | P-109 | 2 | | |
| 4 | End 1 | | | |
| 5 | R-1141 | 2 | | |
| 6 | R-456 | 5 | | |
| 7 | END 2 | | | |
| 8 | P-109 | 2 | | |
| 9 | End 3 | | | |
| 10 | T-350 | 2 | | |
| 11 | End 4 | | | |

Create Sales Order (VA01)

FIG. 3C

| Data | | | _ □ × |
|---|---|---|---|
| Edit Insert Format Tools | | | |
| L1 | =SEARCH("Standard Order * has been saved",M1)>0 | | |
| | order_saved_exp | order_saved_out | ord |
| 1 | TRUE | Standard Order 8170 has been saved | 8170 |
| 2 | | | |
| 3 | | | |
| 4 | | | |
| 5 | | | |

VA01 \ VA01 All_items \ VA01 All_i

FIG. 5C

| Data | | | _ □ × |
|---|---|---|---|
| Edit Insert Format Tools | | | |
| L1 | =SEARCH("Standard Order * has been saved",M1)>0 | | |
| | order_saved_exp | order_saved_out | ord |
| 1 | #VALUE | Standard Order 8170 has been save | # |
| 2 | | | |
| 3 | | | |
| 4 | | | |
| 5 | | | |

VA01 \ VA01 All_items \ VA01 All_i

FIG. 5D

SOFTWARE SYSTEM AND METHODS FOR TESTING THE FUNCTIONALITY OF A TRANSACTIONAL SERVER

RELATED APPLICATIONS

This application claims priority to provisional application No. 60/090,158, filed Jun. 22, 1998, and to provisional application No. 60/129,172, filed Apr. 14, 1999, both of which are incorporated herein by reference.

APPENDICES

This specification includes appendices A and B, both of which form part of the disclosure. Appendix A includes testscript code for an example business process. Appendix B, which is provided as a microfiche appendix (consisting of 10 sheets with 589 frames), includes user manuals for three commercial implementations (software products) that embody various inventive features.

BACKGROUND OF THE INVENTION

1. Field of the Invention

The present invention relates to user interfaces and associated methods for testing the functionality of transactional servers.

2. Description of the Related Art

Over the years, computer systems have assumed a growing role in business. Recently, there has been an increase in the use of computers to facilitate business transactions. Transactional servers are computer systems that are used by businesses to automate business processes. For example, a transactional server may be in the form of a web server system that allows customers to access a company's database, or an SAP system which synchronizes the various aspects of production in a manufacturing plant. As transactional servers assume a greater role in business and become more important to companies, the need to ensure proper operation of the transactional server has also become important. Therefore, the transactional servers and the business applications that run on the transactional servers should be properly tested to ensure reliable operation.

Testing tools that interact with the user interface of the transactional server have been used to test transactional servers. These tools typically involve the use of an interpreter and a test script ("script"). The interpreter links to a developer interface and sends commands to the developer interface in accordance with the script. The script is commonly a text file written in a particular test language that can be understood by the interpreter. The script is generally written by a test developer ("developer") that is skilled in the particular script language and in general computer programming principles.

The requirements for the script are typically communicated to the developer by a business person who is familiar with the business process to be tested. Using these requirements, the developer writes a script that simulates the actions of one or more users and monitors the responses of the transactional server. Frequently, once the script is run or "played back," the developer discovers that the script does not comply with all of the requirements or otherwise does not operate properly. The script must then be revised to correct the defect. The process of revising the script and running it may be repeated several times before the developer is satisfied with the script. The series of steps outlined above is typically repeated for every business process that is tested by the testing tool.

One problem with the above-described method is that it typically occupies a significant amount of time of a skilled programmer. As a result, the process of generating the scripts tends to be expensive. Another problem is that the method does not provide an efficient mechanism for varying the data sets used to test the transactional server; typically, these data sets are hardcoded within script, requiring the script to be edited to use new data sets. Yet another problem is that the testing tools frequently do not provide an efficient mechanism for analyzing the results of the functionality test.

SUMMARY OF THE INVENTION

The present invention addresses these and other problems by providing a software-implemented testing tool for generating, running, and viewing the results of tests for testing transactional servers. The various inventive features of the testing tool may be used separately or in combination to test the functionality of a variety of different types of transactional servers. In a preferred embodiment, the testing tool is used to test web-based, SAP-based and mainframe-based servers.

In a preferred embodiment, the testing tool generates tests by recording interactions between a user and the transactional server as the user performs a transaction, such as a business process. For example, in a web-based implementation, the testing tool records interactions between a web browser and a web server, including link selections and form submissions made by the user and pages returned by the server. During or following the recording session, the user can define verification steps to test for expected server responses. For example, the user can define verification steps to test for expected text messages, images, or numerical values within a web page or other screen returned by the transactional server. During execution of the test, which may occur in either an attended or unattended mode, the testing tool "plays back" the recorded user steps while monitoring and recording the responses of the transactional server. The results of the test, including the results of the verification steps, are stored for viewing.

One inventive feature of the testing tool involves displaying the test to the user as a hierarchical node structure, such as a tree, in which steps of the test are represented as corresponding nodes. Preferably, each node is displayed as an icon that indicates the type of the step, together with a textual step name or annotation. To edit the test, the user can select a node from the node structure to view and edit the node's properties. In the preferred embodiment, for example, the user can modify the data input value associated with a data entry step, or modify the verification condition associated with a verification step. The user can also preferably edit the test by performing such actions as dragging-and-dropping and deleting nodes. An important benefit of this feature is that it allows the user to generate and edit tests without the need to know a scripting or other programming language.

Another inventive feature of the testing tool involves the provision of a data table for allowing the user to conveniently specify data sets for running multiple iterations of a test. Using this feature, the user can, for example, record a particular transaction (e.g., looking up and checking the departure time for a particular flight), and then specify additional data sets (e.g., additional flight numbers and expected departure times) to be used to test the transaction. The data table is preferably in the form of a standard-format spreadsheet in which each row corresponds to a single iteration of the test and each column contains the data values to be used with a parameterized step of the test. The use of a spreadsheet for this purpose allows the test author to use standard spreadsheet functions and/or existing spreadsheet data to specify data sets (which may include both input values and expected results) for testing recorded transactions. During execution of the test, the testing tool automatically uses the data sets within the data table to run multiple iterations of the test. The testing tool preferably stores the results of the verification steps in a separate results spreadsheet.

Another inventive aspect of the testing tool involves displaying captured server screens in conjunction with corresponding nodes of the hierarchical node structure to facilitate test editing. When the user selects a node that corresponds to a particular server screen, the testing tool automatically displays the screen to the user (preferably in a separate window). In addition, when the user selects a node that corresponds to a particular screen object (e.g., an input field), the testing tool automatically highlights the object within the screen. The testing tool may also be configured to highlight a node (if any) within the node structure when a user selects a corresponding object within a displayed screen. These features assist the user in identifying the correspondence between particular steps of the test and display elements of the transactional server. The testing tool also preferably displays a context sensitive menu which is dependent upon the type of object (table, field, field, etc.) currently selected in the displayed screen.

Yet another inventive feature of the testing tool involves displaying the results of test execution using a hierarchical node structure ("report tree") in which steps of the test are represented by corresponding nodes. When the user selects a node from the report tree, the testing tool automatically displays results (e.g., a returned screen, or results of a verification step) associated with the corresponding step. Results of verification steps are also preferably represented graphically within the report tree, such as by displaying a green check mark or a red "X" symbol to indicate pass/fail status. If the test was executed multiple times with different data sets, each iteration is preferably represented within the report tree by a corresponding node (together with a graphical indication of pass/fail status) which can be expanded to view the details of the iteration.

BRIEF DESCRIPTION OF THE DRAWINGS

The foregoing features and other features of the present invention will now be described with reference to the drawings of a testing tool that represents a preferred embodiment of the invention. In the drawings, like components have the same reference numerals. The illustrated embodiment is intended to illustrate, but not to limit the invention. The drawings include the following figures:

FIG. 3C illustrates a data spreadsheet for a loop object;

FIG. 5C illustrates a data spreadsheet when the formula condition is satisfied;

FIG. 5D illustrates a data spreadsheet when the formula condition is not satisfied;

DETAILED DESCRIPTION OF A PREFERRED EMBODIMENT

A software-implemented testing tool which embodies the various inventive features and concepts will now be described with reference to the drawings. The user's manuals for three commercial implementations that embody some of the features of the invention are included in the microfiche appendix. The first commercial implementation, referred to as Astra QuickTest™, is used to test the functionality of web-based transactional servers. The second, referred to as QuickTest™ for R/3, is used to test SAP-based transactional servers. The third, referred to a QuickTest 2000™, is used to test mainframe-based transactional servers. The various features of the invention may also be used to test other types of transactional servers.

Throughout the description, many of the drawings and examples correspond to a particular commercial implementation of the testing tool. It should be understood, however, that the described features are applicable to other types of transactional servers. In addition, it should be understood that the specific embodiments described herein are intended to illustrate, and not limit, the scope of the invention. For example, although the disclosed commercial implementations embody multiple inventive features, it should be understood that some features could be implemented without others.

For convenience, the testing tool will initially be described from the viewpoint of an end user of the program. The underlying methods and data structures used by the testing tool will thereafter be described.

I. Terminology

The following terms will be used throughout the description:

Transactional server: A computer system that responds to requests from users on a computer network. Typically, at least some of the responses involve accesses to a database.

Business process: A series of user interactions with a transactional server to accomplish a business task, such as creating a sales order, creating an invoice, or purchasing an item from a catalog.

Test: Generally, a computer representation of a sequence of user interactions with a transactional server. The test may be "played," "run" or "executed" under the control of a testing program to test the transactional server. Typically, each test represents a single business process or a set of related business processes. In the preferred embodiment, a test is generated in-part by recording a user session with the transactional server; during or following this process, the user can add verification steps to the test to specify expected server responses, and can parameterize variables to run the test with multiple sets of data.

Parameter: A container for dynamic test data, such as a value specified by a user or a value returned by the server.

II. Overview of Test Generation Process

Figure 1:
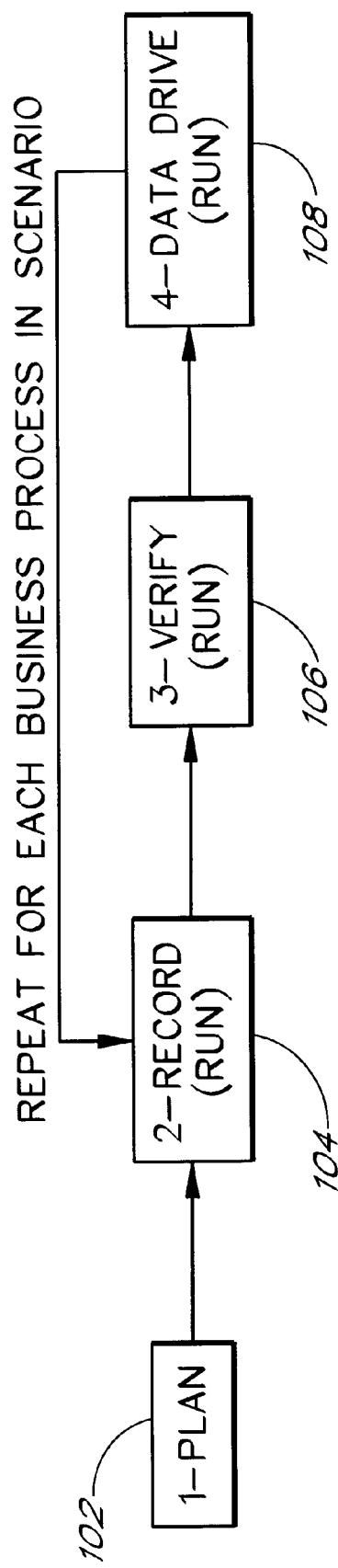
FIG. 1 illustrates the main steps involved in a preferred process of developing functionality tests for transactional servers.

The creation of a test using the testing tool generally involves four steps, as is illustrated by FIG. 1. The first step 102 is to plan the test to determine the business process(es) and features to be tested. The second step is a recording step 104, during which the user interacts with the transactional server—typically to perform one or more business processes. During the recording step 104, the testing tool records the test in memory.

The third step 106, referred to as "verification," involves specifying expected responses from the transactional server. During the verification step 106, the user selects data elements or other portions of the screens returned by the transactional server to be automatically verified during execution of the test. For example, a user may define a verification point to check whether a particular statement is returned by the transactional server in response to a specific entry of data, or to confirm that a particular image appears on a web page. Verification steps may alternatively be specified during the recording process.

The final step 108 is an optional data drive step. As part of the data drive step 108, the user specifies sets of data to be used for multiple iterations of the test. For example, if the test represents a business process for checking the price of an airline ticket, the user may specify a different flight numbers or itineraries to be used for other iterations of the test. As described below, an important feature of the testing tool involves a spreadsheet for allowing the user to conveniently specify the data sets.

An important feature of the testing tool involves representing the test to the user as a hierarchical node structure in which different nodes represent different types of steps. The node structure is preferably in the form of a tree, although a directed acyclic graph or other hierarchical structure could be used. Using this node structure, the user can perform such actions as adding, deleting and parameterizing steps and controlling the execution of the test. A corresponding node structure (FIGS. 5E and 5F) is also preferably provided for viewing the execution results of the test. Another important feature involves displaying captured server screens to the user in a form in which the user can select data fields and other screen elements, such as to modify properties associated with such elements and define verification steps.

As depicted in FIG. 1, the steps of recording, verifying, and data driving are typically repeated for each business process to be tested. For example, to test an "order entry" business process, the series of user steps taken in placing an order would first be recorded. Second, certain elements of the returned screens, such as price values or order confirmation messages, would be selected for verification. Finally, additional data sets to be submitted to the transactional server during test execution may be specified. These data sets may, for example, represent orders for other products. If another business process is to be tested, such as a "send to inventory" business process, the user may again record the steps that are necessary to accomplish the business process 104, select portions of the returned screens to verify 106, and then specify additional data sets to be used during execution of the test.

Tests that are generated using the FIG. 1 process may be executed as needed (e.g., biweekly) to test the operation of the transactional server. Preferably, the testing tool allows the user to schedule test execution events to permit unattended testing of the transactional server. The results of such unattended tests may, for example, be communicated to a system administrator by email, or simply stored for subsequent viewing. The tests may also be used to load-test the transactional server.

The user interface features used for performing the recording, verifying and data driving steps in FIG. 1, and for editing and executing tests, will now be described with reference to example screen displays of the testing tool. Additional screen displays and description are provided in the microfiche appendix. In addition, descriptions of the main menu commands provided in an SAP-based implementation are provided in Table 1.

TABLE 1

MENU COMMANDS FOR SAP-BASED IMPLEMENTATION

| COMMAND | DESCRIPTION |
| --- | --- |
| File → New, Open, Save, Save As, Exit | Recent file list - Windows standard functionality. |
| File → Reload | Reverts to the last saved copy of the test. |
| File → Import | Opens the Import dialog box so you can import business processes and their related data, scripts, and screens (excluding views). Automatically links the imported business processes to the current view. |
| Edit → Delete | Windows standard functionality. |
| Edit → Rename | Opens the selected step for editing. |
| Edit → Find | Opens the Find & Replace dialog box. Works only with scripts. |
| Edit → Properties | Opens the Properties dialog box for the selected step. |
| Insert → Record | Starts the recording process. |
| Insert → Stop Recording | Stops the recording process. |
| Insert → New Business Process | Adds a new business process to the tree of the current Test. |
| Insert → Business Process to View | Opens the Select Business Process dialog box. Pressing the OK button adds the selected business process to the current view. |
| Insert → Input | Adds an input parameter under the current screen step. Opens the Select Objects dialog. The cursor changes to a pointing hand. Clicking on a screen object, adds an input parameter step to the tree for that object. |
| Insert → Output | Adds an output parameter under the highlighted screen step. Opens the Select Objet dialog. The cursor changes to a pointing hand. Clicking on a screen object, adds an output parameter step to the tree for that object. |

TABLE 1-continued
MENU COMMANDS FOR SAP-BASED IMPLEMENTATION

| COMMAND | DESCRIPTION |
| --- | --- |
| Insert → Verification | Adds a verification step under the highlighted screen step. Opens the Select Object dialog. The cursor changes to a pointing hand. Clicking on a screen object, adds a verification step to the tree for that object. |
| Insert → Step | Allows you to add an additional step to the test above the highlighted screen step. |
| Execution → Run | Runs the entire test starting from the top, for as many iterations as there are rows in the data Spreadsheet for this test or for selected rows only. Use Run Test when you wan to run all the business processes in a test. |
| Execution → Run from Cursor | Runs the entire test starting from the cursor position. When the testing tool reaches the end of the test, it "wraps" around to the first business process and continues until it reaches the cursor. Use this feature when you want to begin a run from a business process other than the first one in the test. |
| Execution → Run to Cursor | Runs from the top of the test (or from the step where the execution was paused) to the cursor. This has the same effect as inserting a breakpoint at the cursor position. Use this option when you want to stop the run after a certain business process other than the last one in the test. |
| Execution → Step Over | Executes the currently highlighted tree branch, then moves the next available step and stops. Steps executed include the current step and any "child" steps below it in the tree. Used for troubleshooting. |
| Execution → Step Into | Executes only the currently highlighted tree step, then moves to the next available step and stops. Used for troubleshooting. |
| Execution → Pause Run | Stops the run temporarily. Resume by selecting Run from Cursor (in this case the cursor need not be on a business process step - in fact, you should not move the cursor manually before resuming). Use Pause Run when you want to take extra time before continuing. |
| Execution → Stop Run | Stops the run. |
| Execution → Insert/Remove Breakpoint | Inserts or removes a breakpoint. Breakpoints stop a run. Used for troubleshooting. |
| Execution → Execution Settings | Opens the Executions Settings dialog box. The following settings can be selected from the Next Error Handling drop-down list in the dialog. |
| Interactive Prompt | (the default) causes the Object not found dialog to display when an error occurs. |
| Ignore error and continue | Causes the testing tool to try to continue the run from where the error occurred (this may not be possible). |
| Skip Business Process | Skips the current business process and continues with the next one in the test if there is one. |
| Skip Iteration | Skips the current iteration and continues with the next one if there is more data from this test. |
| View → Toolbar | Displays or hides the five toolbars: File, Edit, Insert, Execution, and View. Toolbars display as icons above the Tree window and Screen Capture window. |
| View → Customize | Opens the Customize dialog box. |
| View → Status Bar | Displays or hides the status bar at the bottom of the Workspace. |
| View → Front for R/3 | Brings an open R/3 window to the front of the user's screen. |
| View → Parameter Data | Opens the data spreadsheet. |
| View → Results Data | Opens the results spreadsheet. |
| View → Execution Log | Opens the Execntion Log window. |
| View → Screen Capture | Displays or hides the Screen Capture window. |
| View → Data Explorer | Opens the Data Explorer dialog box which shows all data components belonging to the test. |
| Tools → Test Director | Allows you to connect to TestDirector. After connecting, the testing tool File menu items Open and Save As operate on TestDirector files. Also allows you to launch the testing tool from TestDirector. |
| Tools → Start AUT [Front for R/3] | (Shows "AUT" when menu is first opened; changes to "Front for R/3" when cursor passes over the item.) Opens the R/3 Logon dialog and allows you to log on to an R/3 system. This feature stores logon information for multiple R/3 servers. |
| Tools → Stop Front for R/3 | Terminates the R/3 client. |
| Tools → AUT [Front for R/3] Settings | (Shows "AUT" when menus is first opened; changes to "Front for R/3" when cursor passes over the item.) Opens the R/3 Logon dialog. Allows you to make changes while the front is running. Does not allow you to log on to an R/3 system. |
| Tools → View Manager | Allows you to create, delete, and modify test views. |
| Tools → Save Layout | Saves the preferred window size and position settings separately for each major activity: design, record, and playback. |
| Tools → Options | Opens the Options dialog box. Options are global, affecting all tests. See "Options dialog box," on page 106 in this chapter for more information. |
| Tools → Expert | Opens these files for the current test and business process:<br>BP file (.bps)<br>View - USR File, CGF File, PRM File<br>Test File (.bpw) |

III. Test Recording and Editing

During the recording process, the user interacts with the transactional server through the user interface of the testing tool to perform the various user steps of the business process. For example, in a web-based implementation, the user interacts with a web server through a browser window of the testing tool, and in an SAP based implementation, the user interacts with the R/3 system through an R/3 client window. During the recording session, the testing tool records protocol-level submissions by the user and responses from the transactional server. In some implementations, the user can specify a check (add a verification step) without halting the recording process. The steps performed by the user during this session, and the responses from the transactional server, are displayed as nodes in a tree window (see FIG. 2, discussed below).

Figure 2:
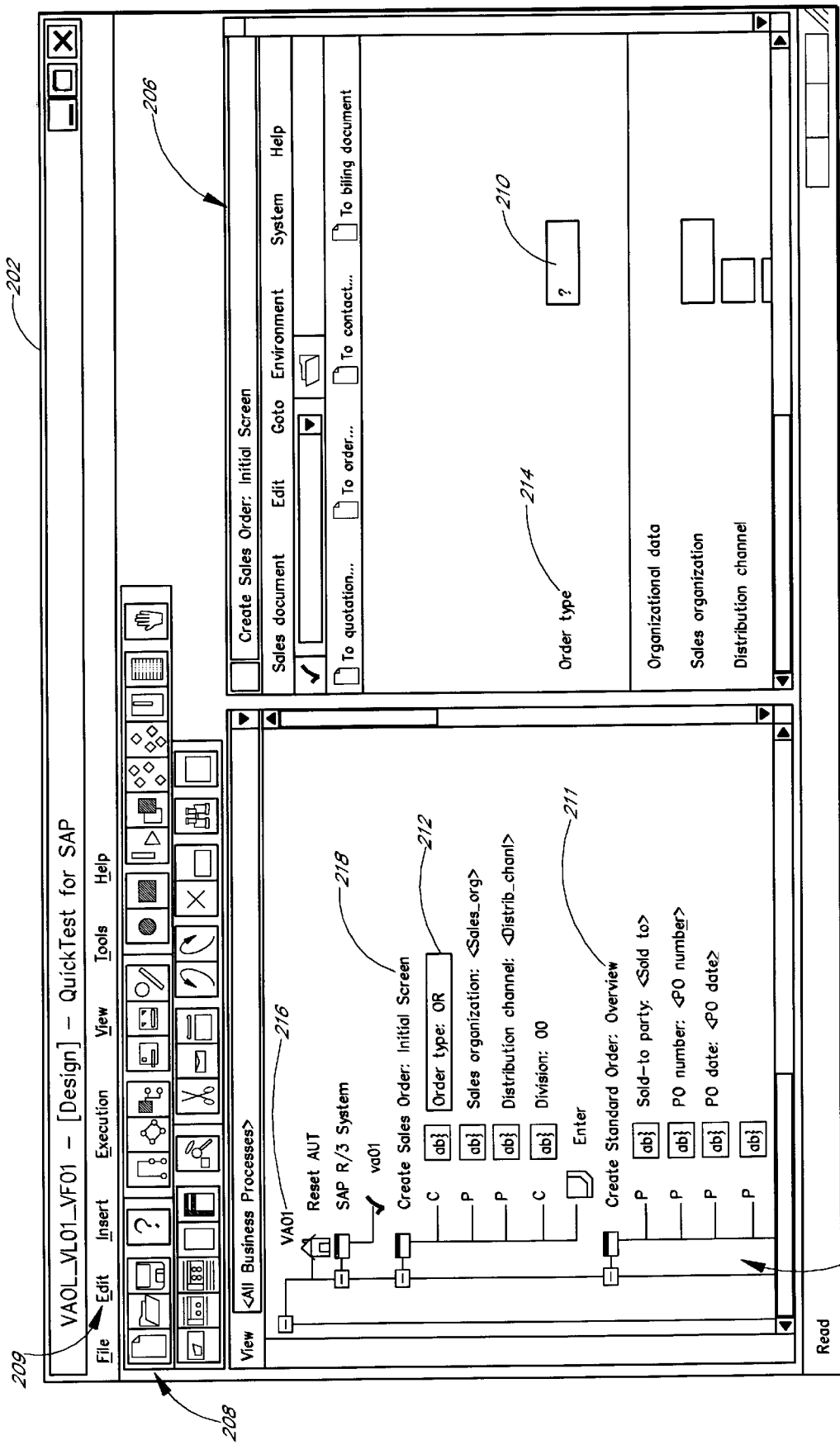
FIG. 2 illustrates a screen of a testing tool in accordance with the present invention.

FIG. 2 is an example the testing tool screen following the recording of a user session with an SAP-based transactional server. The testing tool screen includes a screen capture window 206, a tree window 204, a tool bar 208, and menu items 209. The screen capture window 206 displays screens returned by the transactional server. As discussed below, the screen capture window 206 displays the server screens in real-time during test recording and playback. During editing of the test, the screen capture window 206 displays the server screens that were returned and captured during the recording session. The tree window 204 includes a hierarchical representation of the steps and screens returned by the transactional server, as discussed below. The tool bar 208 provides certain tools for use in editing and creating the test.

With reference to FIG. 2, the user can start a recording process by clicking on a record button that is provided within the user interface 208. In the SAP-based implementation depicted in FIG. 2, a reset step ("Reset AUT") is automatically inserted at the beginning of the test to ensure that all business processes start from the initial screen of the transactional server. As predefined types of steps are performed during the user session with the transactional server, the testing tool adds the steps to the tree window 204 as respective nodes and annotations (step names) of a hierarchical node structure, which is preferably a tree. The tree provides a visual representation of the test and the associated business process 216. In the illustrated embodiment, the tree is presented as a standard Windows 95/98 type tree structure in which nodes can be expanded and collapsed using the plus and minus symbols.

Each node of the tree generally represents one "step" of the test and is represented with a corresponding icon. The type (image) of the icon provides a visual representation of the type of step. A step may, for example, represent a business process, a screen, an input or output field, a table, a verification point, selection of hyperlink, or another user action. Preferred sets of steps types that are used in the web and SAP based implementations are provided in Tables 2 and 3, respectively.

Each step type is represented with a corresponding icon. For example, the order type entry field 210, identified by the corresponding field label "Order type" 214 in FIG. 2, is represented by an entry field icon 212 in the tree. The icon 212 is located below the "create sales order screen" icon 218 and is one level indented indicating that the entry of the order type is a step of the "create sales order" business process.

TABLE 2

TREE STEPS FOR WEB-BASED IMPLEMENTATION

| STEP | DESCRIPTION |
|---|---|
| URL | A URL (web address) icon is always the first icon in a web test. It is also added when the user selects a bookmark or types a URL during recording. Properties: step name, URL, name of target frame. |
| Link | A link icon is added to the test tree when the user clicks a hypertext link in your web site. Properties: step name, text, frame where link located, target frame, ordinal (a number which uniquely identifies link when all other attributes are identical to other link(s) on page). |
| Image | An image icon is added to the tree when the user clicks a hypergraphic link in the web site. Properties: step name, ALT attribute. SRC attribute, map name, area ALT attribute, area ordinal, frame where image located, target frame, ordinal. |
| Submit Form | A submit form icon is added to the test tree when the user submits a form of data to the web site for processing. Properties: action, frame, target frame, ordinal hidden. |
| Custom Request | A custom request icon is added to the test tree when the user creates a custom HTTP request for a URL. Properties: step name, method, URL, body, binary data, target frame. |

TABLE 2-continued

TREE STEPS FOR WEB-BASED IMPLEMENTATION

| STEP | DESCRIPTION |
|---|---|
| Service | A service icon represents a step that performs customization tasks such as setting prices, submitting authorization information, and issuing customized headers. Properties: type, arguments. |
| Submit Data | A submit data icon is added to the test tree when the user submits a form of data to the web site for processing. Properties: step name, and name, value and type of each data argument on form. |
| Text check | A text check is a search for a specified text string on a web page. Properties: step name, frame, text string, type, table check (Y/N), inside (Y/N), "right of" text, "left of" text, check options. |
| Image check | An image check is a search for a specified image on a web page. Properties: step name, frame, ALT attribute, SRC attribute, check options. |
| Applet Check | An applet check is a search for a specified Java applet on a web page. Properties: step name, frame, class name, arguments to pass to applet, check options. |

TABLE 3

TREE STEPS FOR SAP-BASED IMPLEMENTATION

| STEP | DESCRIPTION |
|---|---|
| Business Process | This is not a recorded step. It is the top step of any business process and is inserted automatically when recording a new business process. All steps occurring during a business process are indented under this icon. |
| Buttonpress | Buttons generally activate screen-specific functions. For example, the Create Standard Order: Overview screen has buttons labeled "Availability," "Pricing," and "Sched. lines." |
| Input | Field a user can type data into; optionally may have a matchcode list associated with it. In the tree window this icon has a white background to distinguish it from the Output step icon (see below). To the left of each Input Step icon is the letter "C" (for "constant" or static text) or "P" (for "parameter" or variable text). To the right of each icon is the input field's name followed by a colon and the data value entered into that field during recording for constants or the parameter name. The data values for this step can be changed via the Input tab of the Properties dialog box. |
| Keypress | Keys are generally represented in the R/3 GUI by icons and activate functions commonly used in many screens, such as Save, Enter, Choose, Back, etc. |
| Loop | A collection of input (data entry) fields that are treated as one object by the R/3 GUI. Loop objects allow multiple values to be entered for each field. |
| Matchcode | Open a matchcode list. The icon for the step to close a matchcode list is the same except the direction of the arrow is reversed. |
| OK Code | Enter an OK code (e.g., VA03, MM01) in the common field. |
| Output | This is not a recorded step. In general, an output step is associated with an output parameter. Parameters are used to store data to be used later. In this case, the parameter captures and stores output from the screen. In QuickTest's tree window this icon has a yellow background to distinguish it from the Input step icon. |
| Reset AUT | The step following the business process step, "Reset AUT" is inserted when the user starts recording. |
| Screen | These represent individual R/3 screens that separate during recording. Steps for all actions occurring on a screen are indented under the screen's icon. |
| Selection | Select from a list (e.g., matchcode) |
| Set Focus | This step represents clicking on a field to place the cursor there. |
| Table | A collection of input (data entry) fields that are treated as one object by the R/3 GUI. Tables allow multiple values to be entered for each field. |

TABLE 3-continued

TREE STEPS FOR SAP-BASED IMPLEMENTATION

| STEP | DESCRIPTION |
|---|---|
| Verification | This is not a recorded step. Verification is a specialized step used to enhance automated tests. In general, a verification step compares text on a screen with a stored value during playback. It then reports a pass or fail status to the Execution Log. |

Through the testing tool's interface, the user can edit the tree to modify the test, without the need to know a scripting language. Edits that can be made to the tree include inserting steps, deleting steps, dragging and dropping steps to new positions, and modifying step properties. For example, by right-clicking on an icon and then selecting "properties" from the pop-up menu, the user can edit the properties associated with each node. An example of a properties dialog box that is displayed for a "text check" verification step in the web-based implementation is shown is FIG. 3D; from this dialog box, the user can specify parameters for checking for a text string on a web page. In general, the types of properties are definable for each node depend upon the type of the step. Some of the properties that may be associated with a step are listed in Tables 2 and 3.

In addition to recording the steps that are performed by the user, the testing tool captures the screens returned by the transactional server in response to user steps, and displays these screens in the capture window 206. The captured screens are further represented in the tree window 204 as respective icons and annotations (211 and 218 in FIG. 2). During editing of the test, the captured screens are preferably displayed in the capture window 206 in an active format which permits the user to select fields and other elements of the screens (as described below).

The front end used to access the transactional server from within the testing tool is preferably a commercially available client component. For example, the front end may be a commercially-available web browser (for web-based implementations), SAP R/3 client (for SAP based implementations), or terminal emulator (for mainframe applications). In one embodiment, a separate viewer (e.g., web page viewer) is included a part of the tool for viewing screens returned by the transactional server.

The tree representation within the tree window is structured in a hierarchical manner so as to indicate the interrelations between the steps and the screens that are a part of a business process. For example, the business process title 216 is displayed at the top of the tree, and is followed by an ordered sequence of the steps taken during the business process and the screens returned by the transactional server. Each screen is represented at a higher level within the hierarchy than the steps that were taken within that screen. In this manner, the user can easily locate steps that are taken within a certain screen or locate a specific screen that was returned within a business process. This ability to quickly locate and identify steps and screens that are part of a business process makes the editing and reviewing of a test fast and simple. As described below, the testing tool automatically converts the tree representation of a test into a test script representation for execution.

In one embodiment, when user data is entered in a field of the transactional server screen displayed in the capture window 206, such as the order type field 210, the corresponding step 212 in the tree window 204 is highlighted. Similarly, when the user selects a step of the tree, the corresponding server screen is displayed in the server capture window 206 and the corresponding screen object (if any) is highlighted. In this manner, the user can easily locate a step or associated screen field, such as to modify step properties during editing of the test. The user may, for example, wish to skip a step, change data values for a step, parameterize a step, or merely view the properties that are currently associated with a step. The quick identification of steps greatly accelerates and simplifies the test editing process.

With reference to the tree window 204 of FIG. 2, it may be appreciated that the screens and other steps are provided in a sequential order. The execution of the test would follow the same sequential order (i.e., from top to bottom). The user can select to start the execution of the test from any particular point in the tree. For example, by highlighting the "create standard order" step 211, the user can select to execute the steps of the test from that particular step. When the execution reaches the final step represented in the tree window 204, the testing tool wraps around to the beginning of the tree and executes the steps prior to the selected step. The user can also modify the properties of a business process or a certain step so as to skip a step or skip an entire business process. The user can further select to skip a step or a business process for a single iteration, or all iterations, of the test. Alternatively, a single stepping option is available such that the user can select each step that is executed. As indicated above, when the user reviews the recorded test by selecting icons in the tree window 204, the corresponding transactional server screens captured during the recording process are displayed in the server capture window 206. The testing tool presents these captured screens in an Active Screen™ format that allows the user to select objects and assign properties to objects within a screen. The Active Screen format preferably allows the user to manipulate an object on the screen (e.g., a text area) to modify properties that are associated with the object. For example, the user can select a text entry field and choose from the option menu to modify the properties of the object. The user can also select the elements of the server capture window 206 to identify the corresponding node of the tree window so as to modify properties associated with the object. For instance, a user may wish to modify the value entered in the "Order number" field. To modify the value, the user can right-click the field to view the pop-up menu and then select the "properties" option. In the "properties" dialog box, which then appears, the value for the field can be entered in the field corresponding to "constant" data.

IV. Verification

Verification involves the addition of automated "checks" or "verification steps" to the test. During execution of the test, these verification steps are used by the testing tool to automatically verify the functionality of the transactional server. When selecting elements to verify, the user is concerned with not only the continual execution of commands by the transactional server, but also with the data that is returned by the transactional server.

In the preferred embodiment there are two types of verifications that can be entered into a test. A static verification is an expected value that is in the form of hard-coded text. For example, the user may require a message box to display "there is unread mail in your mailbox" in response to a particular step. This verification requirement would be a static requirement because the expected result is in the form of fixed text. Other examples of static verification include an expected image, an expected applet, and an expected numerical value. A dynamic verification point is an expected result that is dynamically created during the execution of the test. For example, the user may require a message such as "standard order [number] has been saved." This dynamic verification is a combination of static text and a value that is inserted into the verification statement during execution. The dynamic portion of the verification step is a placeholder for a variable or a logical formula that is used to dynamically build the verify condition during execution.

To choose an object for verification, the user can insert a verification step to the tree by either directly inserting a new step into the tree window or by right-clicking on a step that has already been exercised during the recorded session and selecting the "verify" option from the pop-up menu. The user can then enter a formula to define the relationship between the input parameter and the output parameter or, alternatively, use a formula builder (described below) to automatically create a formula defining the verification condition.

For example, for a "create delivery" business process, to ensure that a statement such as "order created" is returned once the order is sent by the user, the user can select the status bar for verification by right clicking on the text area for the status bar and then selecting "verify" from the pop-up menu. In the properties dialog box the user can select the expected as "constant" and enter the statement "order created." If the user wishes to test for a result that is not constant, a formula in the data table (discussed below) can be used to define the expected result. An example formula is "standard order * has been saved," with the asterisk serving as a placeholder for any number or word.

Figure 4A:
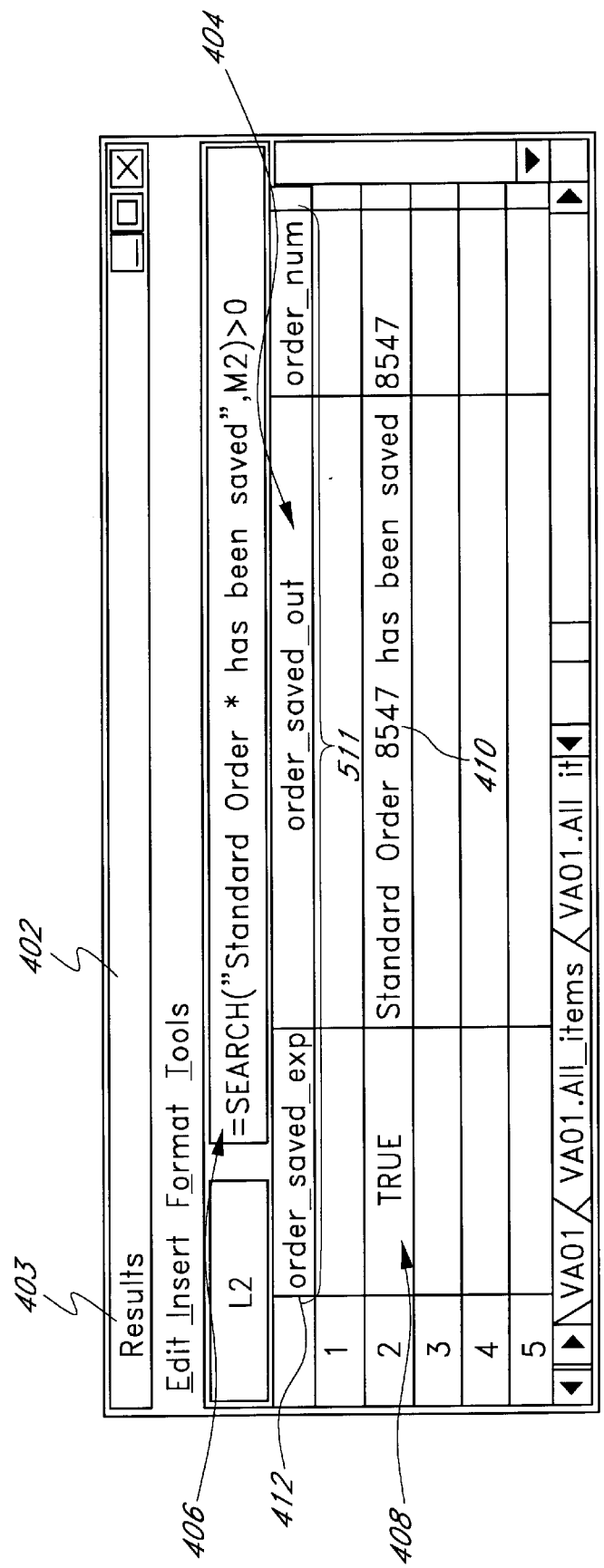
FIG. 4A illustrates a results spreadsheet that provides a verification condition for a test.
Figure 4B:
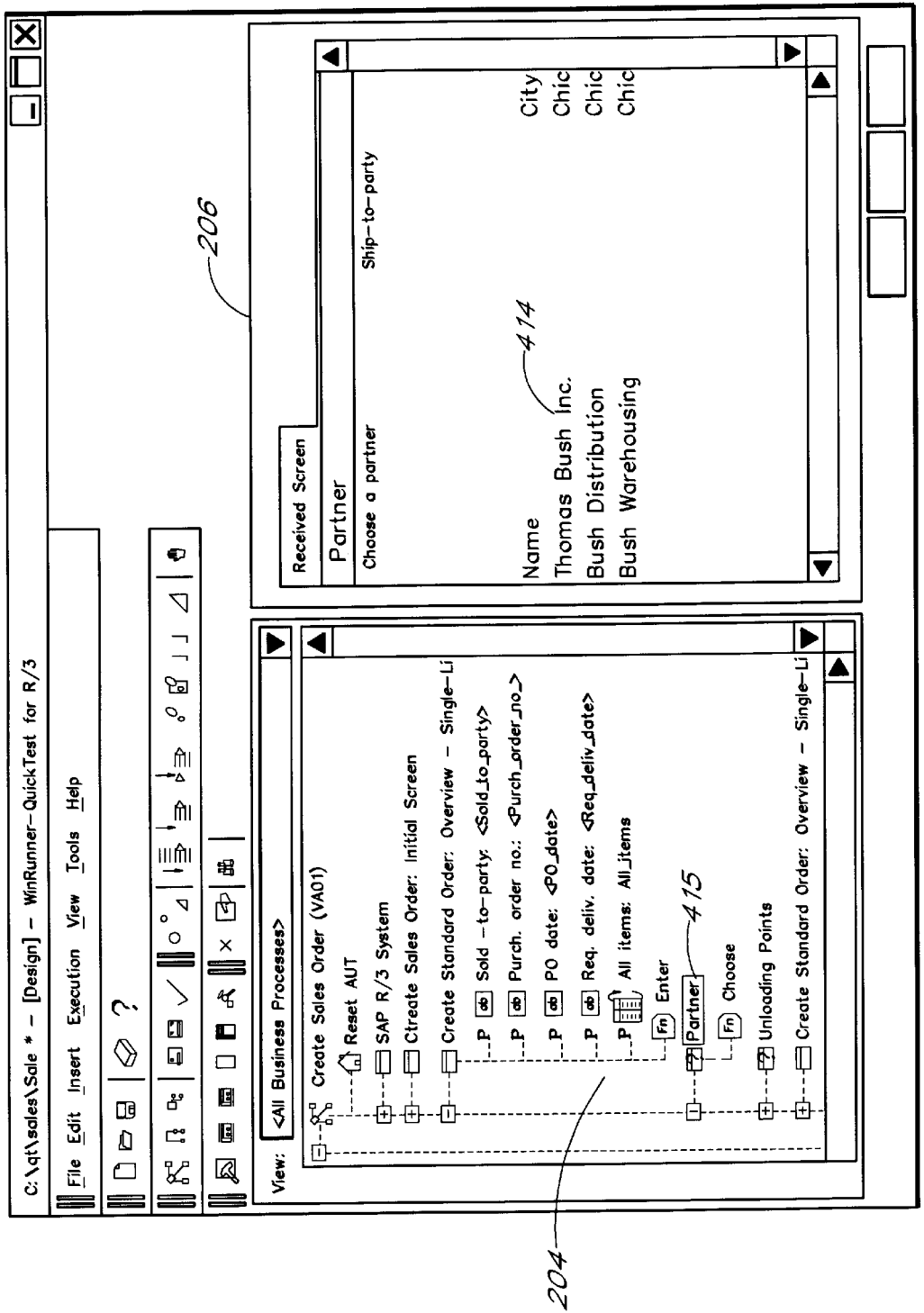
FIG. 4B illustrates a screen of the testing tool before the selection of text for verification.
Figure 4C:
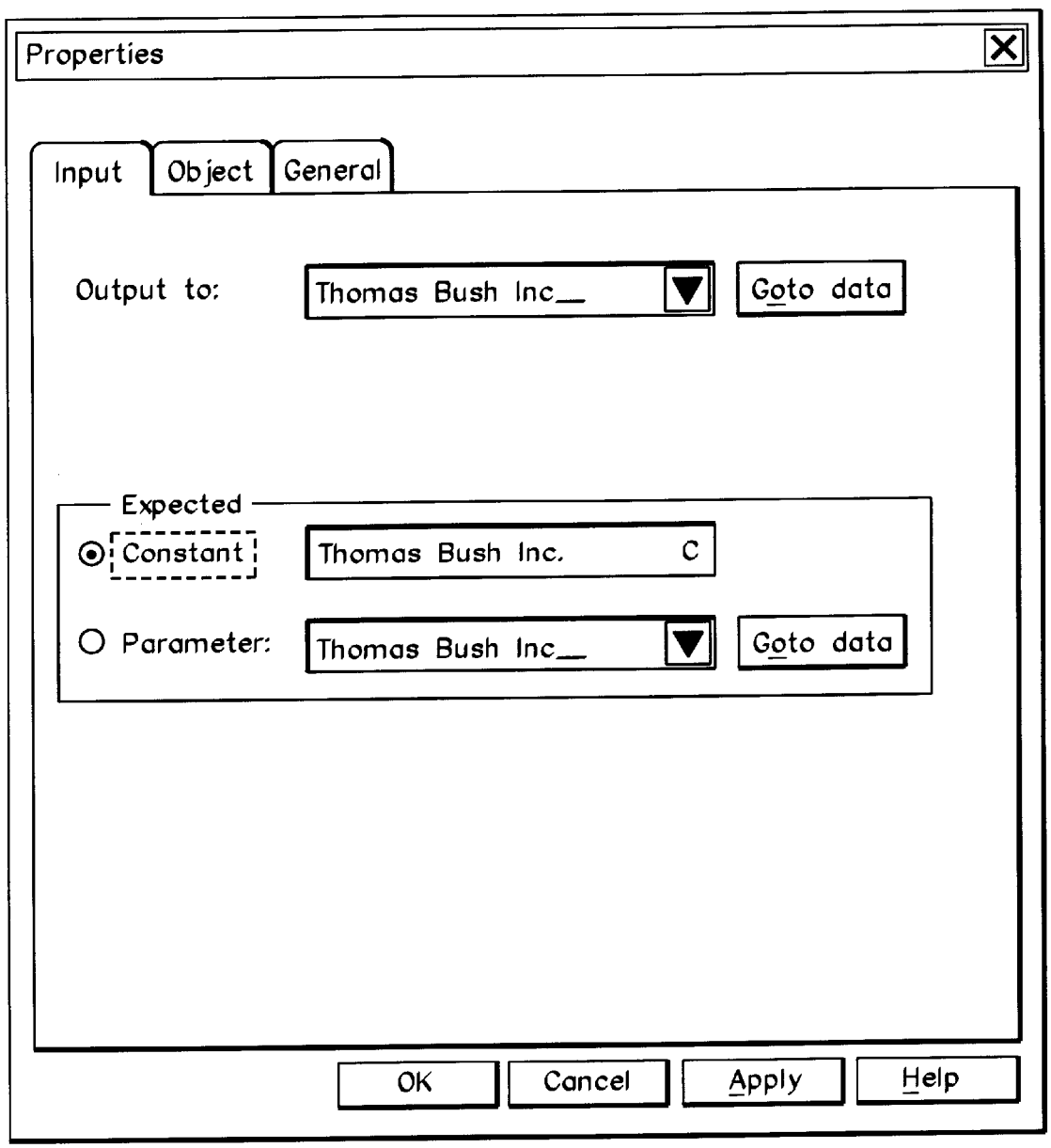
FIG. 4C illustrates a verification dialog box of the testing tool.
Figure 4D:
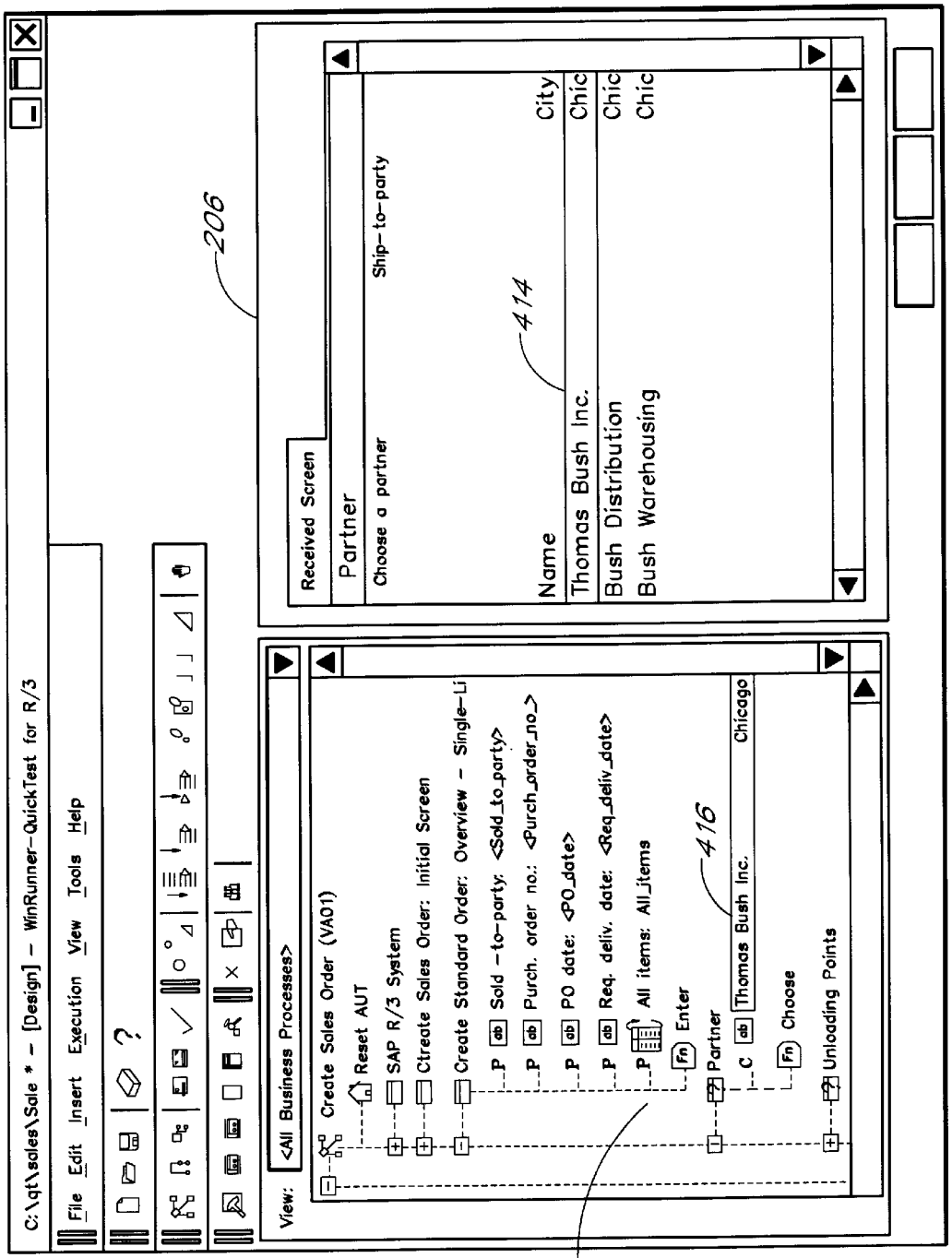
FIG. 4D illustrates a screen of the testing tool after the selection of text for verification.

FIGS. 4B, 4C and 4D illustrate an example of the process for selecting an object of a captured (active) screen 206 for verification in an SAP-based implementation. In one embodiment, the verification step may be inserted either during or following the recording session. The object to be verified in the example is the first entry 414 in the partner list. To select the first entry for verification, the user clicks on the text area of the entry 414 (FIG. 4). The user can then right click to bring up a pop-up menu, or click in the toolbar on the button that is associated with adding a verification step.

Once the verify option is selected, the testing tool presents a dialog screen as illustrated in FIG. 4C. The dialog screen prompts the user to either select a constant as the expected value, or select a parameter as discussed below. In the present example, the user selects a constant as the expected value. The constant value is automatically entered by the testing tool from the text of the entry 414 that was selected from the screen. The user can optionally modify the text in the expected constant entry box. When the user clicks the "OK" button in the dialog box, the testing tool creates a new node 416 in the tree window 204 that is associated with the verification step. FIG. 4D illustrates the testing tool display after the verification step is added. The new entry 416 includes a verification icon and a text caption of the expected text. The letter "C" is to the left of the icon to indicate a constant expected value. The object that is to be verified 414 is highlighted in the active screen when the associated step 416 is selected.

As indicated at the bottom of Table 2, the web-based implementation supports three types of verifications steps: text checks, image checks and applets checks. Each check is represented with a corresponding icon within the test tree. All three types of checks can be added either during or after the recording process.

Figure 3A:
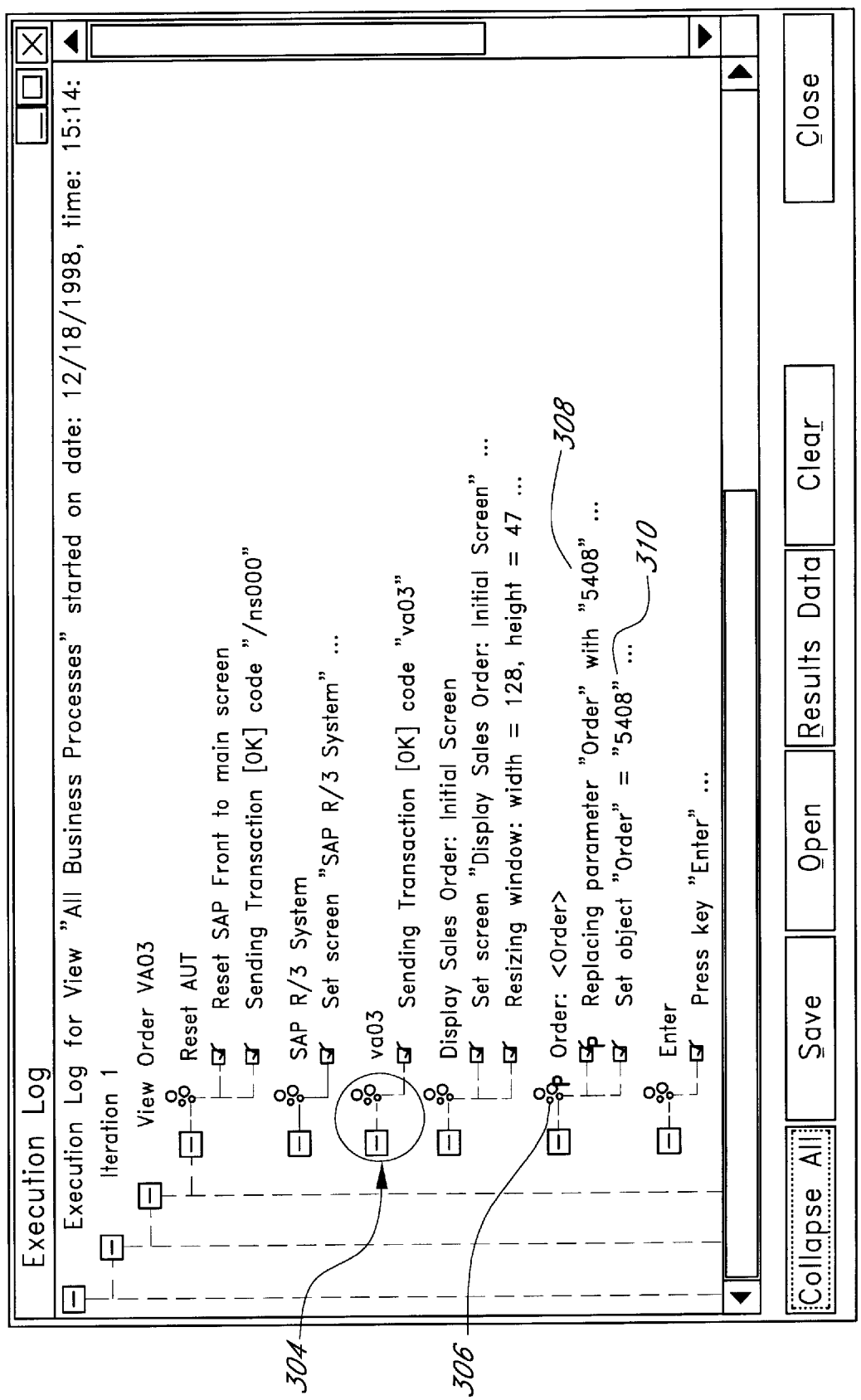
FIG. 3A illustrates an execution log screen that is presented by the testing tool.
Figure 3B:
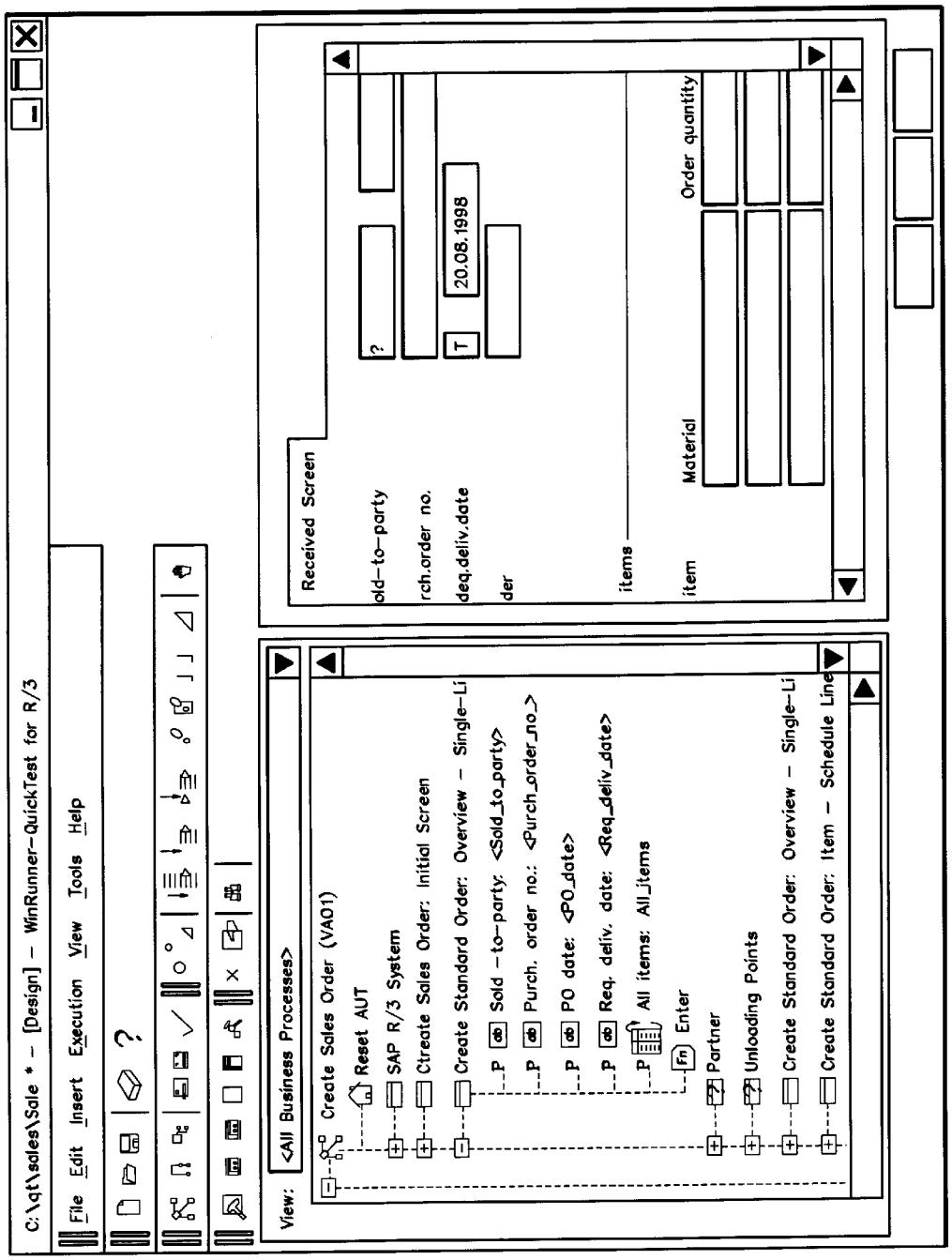
FIG. 3B illustrates a screen of the testing tool when a loop object is selected from the tree window.
Figure 3D:
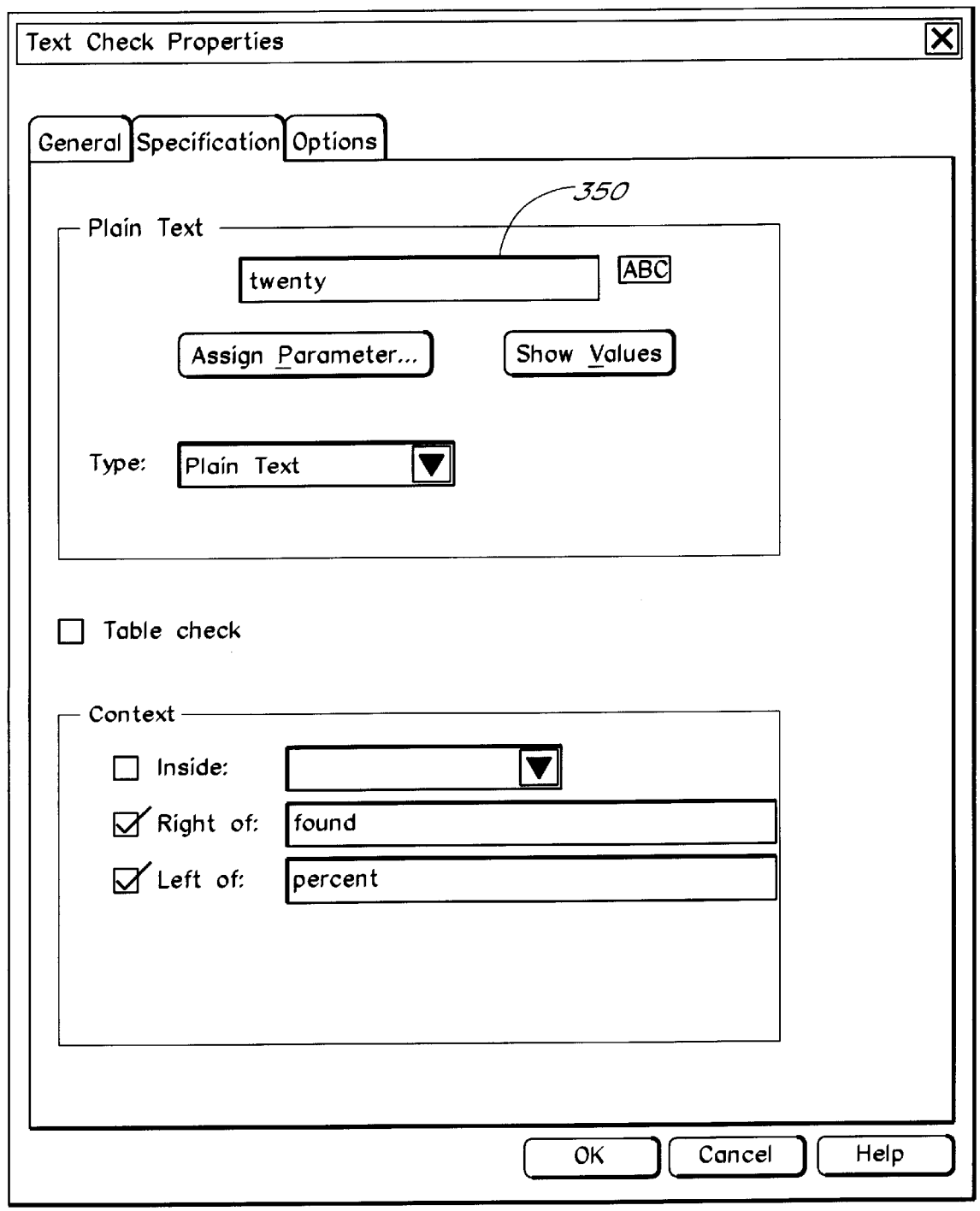
FIG. 3D illustrates text check dialog box.

By way of example, if the user wishes to define a custom text check for a certain text string appearing on a web page, the user highlights the text string on the web page (either during or following the browsing/recording session) and then selects the "User-Defined Text Check" button from the Record Toolbar. The text check properties dialog box opens and displays the specifications tab (FIG. 3D). The text that was selected on the web page is automatically displayed in the Find box 350. From this dialog box, the user can specify one of the following text check types: plain text, number, or regular expression). If the user selects the "number" option, the user is also presented the option to select one of the following check conditions: "Between" (between the range specified in the Find box 350), "Exactly" (the exact number specified in the Find box), "Greater Than" (anything greater than the number specified in the Find box), or "Less Than" (anything less than the number specified in the Find box). In addition, the user can select the "table check" check box (see FIG. 3D) to limit the search to a row in a table of the web page, or can select the "inside" check box to limit the search to text that is part of a hyperlink, list, or combo box. Further, the user can use the "right of" and "left of options (FIG. 3D) to limit the search based on adjacent text. In the example shown, the user has defined a check for the word "twenty" to the right of "found" and to the left of "found" and to the left of "percent" anywhere on the web page. Unless this condition of met during test execution, the testing tool will report a failure. Once the text check has been defined, the testing tool adds a corresponding node (icon and step name) to the tree as a child of the corresponding web page node.

Other types of verification steps and options are described below and in the microfiche appendix. In addition, a formula builder feature that can be used to define verification conditions is described below under the heading "Formula Builder."

V. Parameterization and Data Driving

The testing tool provides the option of using parameters to drive and verify a business process. Parameters provide a mechanism for specifying different data values (both input values and expected responses) to be used with different iterations of a test. For example, in a test which accesses a web site to check prices of airline tickets, a data entry step for specifying a flight number may be parameterized to permit entry of multiple flight numbers (one per iteration), and a verification step for checking corresponding prices may be parameterized to require different dollar amounts or ranges for different flights.

Various options exist for allowing the user to specify the steps to be parameterized; for example, the user can individually specify the steps to be parameterized, and/or can use an "auto record parameterization" option to automatically parameterize all input fields during the recording process. Options may also be provided for parameterizing groups of steps, such as all text checks or all form arguments. In the Sap-based implementation depicted in FIG. 2, parameterized steps are denoted as such in the test tree by the letter "P," while constants are denoted by the letter "C."

To manually select a step to parameterize, the user selects the corresponding node within the tree, and then selects "properties" from the properties menu that appears. The "properties" dialog box (FIG. 4C) appears with the recorded value in the "constant" field of the dialog box. The user can then select the parameter option from the dialog box to choose to parameterize the step. The associated data table (discussed below) for the parameterized step can be accessed by clicking on the "Goto Data" button in the dialog box.

Figure 5A:
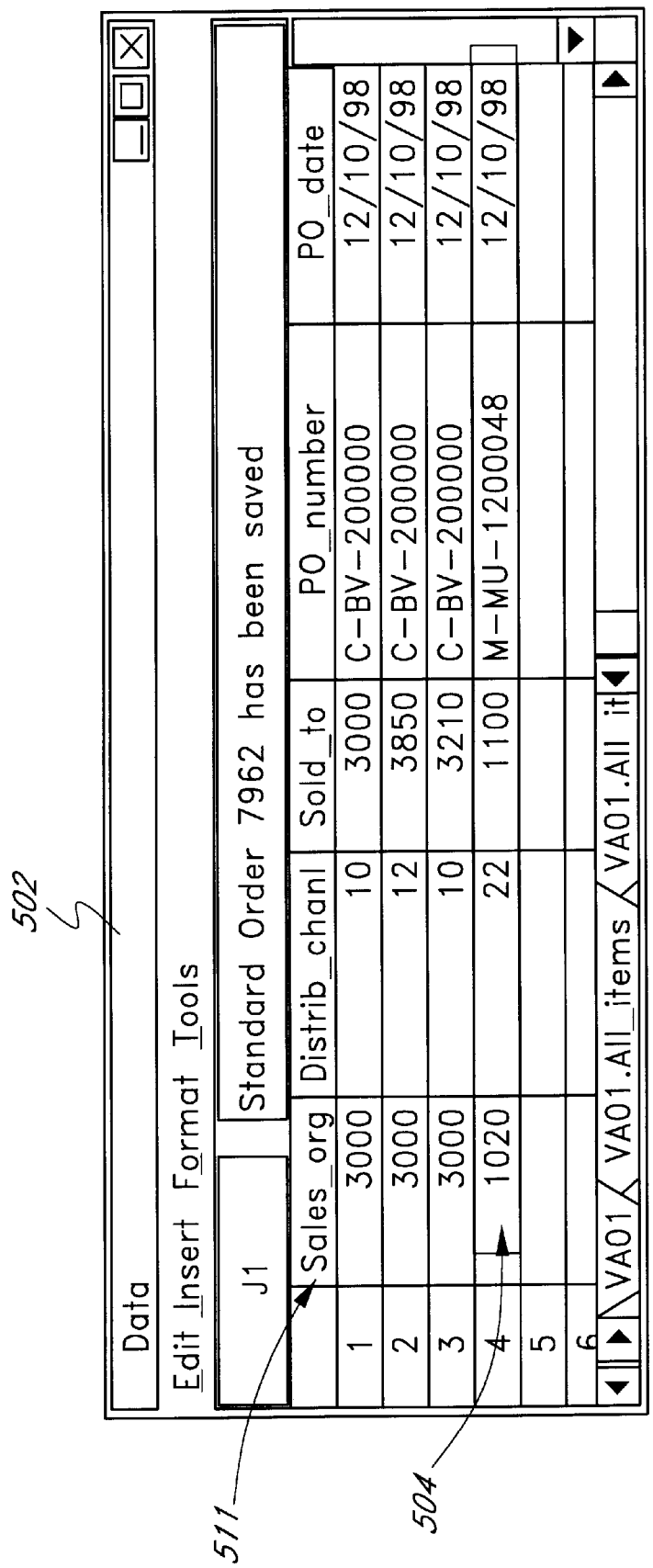
FIG. 5A illustrates a data spreadsheet that is used to provide input data to a test.
Figure 5B:
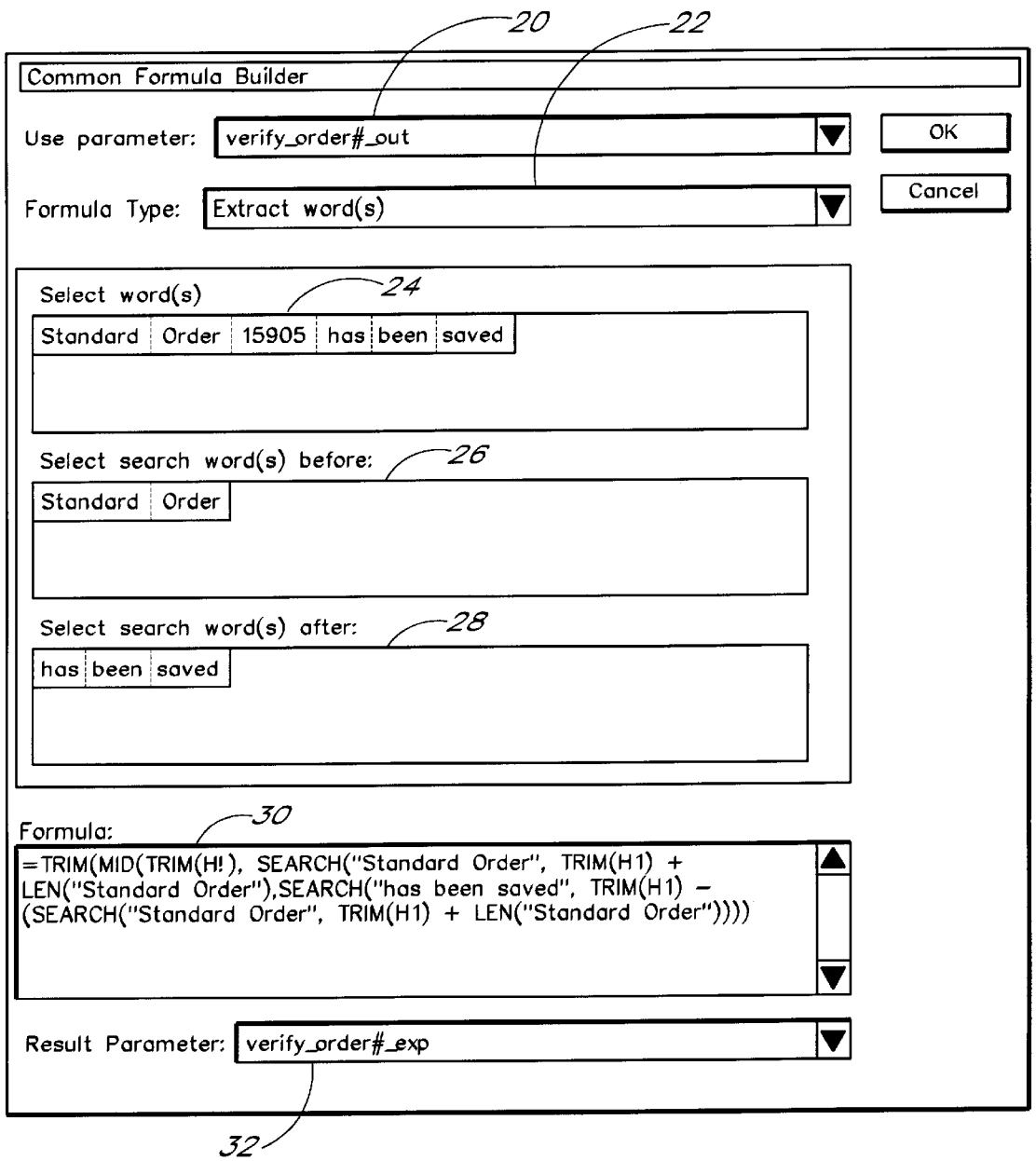
FIG. 5B illustrates a formula builder dialog box of the testing tool.

In accordance with one aspect of the invention, the testing tool uses a data table to allow the user to specify input and expected output values for parameterized steps. The data table is preferably in the form of standard-format spreadsheet, such as a .XLS format spreadsheet. The spreadsheets can be edited by using any common spreadsheet editor such as Microsoft Excel™. The testing tool provides the user with an interface similar to that of a commercial spreadsheet editor for the editing of the spreadsheets. Standard spreadsheet functions and operations can therefore be used to edit the data table, and test data can imported from or exported to other spreadsheets With reference to FIG. 5, the columns 511 of the data table 502 correspond to respective parameters, and contain the data values (input values or expected responses) to be used with such parameters. Each row of the data spreadsheet provides data for a single iteration of the test. (The first row contains data values captured during the recording process.) During execution of the test, the testing tool uses the values of the parameterized input steps to submit data to the transactional server, and uses the values of the parameterized verification steps to verify server responses. For example, during the first iteration of the FIG. 2 test using the data table of FIG. 5A, the distribution channel field would be filled in with the value "10" on the first iteration, the value "12" on the second iteration, and so on. Data fields that are constants (i.e., have not been parameterized) do not change from iteration to iteration.

In one implementation, the testing tool also uses a second spreadsheet, referred to as the results spreadsheet, to store parameter data for the most recent execution of the test. An example results spreadsheet 402 is illustrated in FIG. 4A. The information recorded within the results spreadsheet 402 includes (a) all input data sent to the server, (b) all output data received from the server, and (c) the outcome (TRUE or NOT TRUE) for each verification step. The user can access and view the results spreadsheet through the interface of the testing tool. As with the data table, the results spreadsheet is preferably stored in a .XLS or other standard format. In another embodiment, the input data and the output data are provided in the same spreadsheet such that two fields of the spreadsheet can be compared, once populated, to determine the result of the verification. In the example shown in FIG. 4A, the string "Standard Order 8547 has been saved" returned by the transactional server during test execution matches the expected string formula "Standard Order * has been saved", and the verification result is therefore displayed as "TRUE."

The testing tool preferably uses two types of parameters—input parameters and output parameters. Input parameters are those which are read from the data table during execution, and are used (a) to send data to the server and (b) for verification. Output parameters are used (a) to hold data values returned by the server, and (b) for verification, and (c) correlation. (Correlation is the process of reusing the result from one step as an input to another step). In one implementation, parameter types are indicated within the spreadsheet by color as follows: input parameters holding data to be sent to the server are displayed in blue text; input parameters used for verification have columns shaded in yellow; and output parameters are displayed in gray text.

An important benefit of the data table feature is that it allows the user to record a business process once (with a single data set) and then run the business process with many other data sets. Thus, there is no need for the user to separately record the business process for each data set to be used. The process of using multiple data sets is referred to herein as data driving. Although the data sets are preferably specified using spreadsheets, other techniques for specifying the data could be used. For example, for each parameterized variable, the user could be prompted to enter a list of the data values to be used. A feature for specifying variable-length data sets is described below under the heading "Loop Objects."

The advantages of data driving in accordance with the invention can be illustrated by an example scenario, in which an Internet bookseller wishes to test its book ordering transactional server. The web-based implementation of the testing tool (described in the microfiche appendix) may be used for this purpose. The bookseller may wish to verify the accuracy of prices and serial numbers returned in response to queries for books by title and author. The user would start by recording the steps that are involved in submitting a query for a book using its title and author. The user would then be presented with a response from the transactional server that includes the book's price and serial number (e.g., ISBN). After the testing tool records the user steps and the response from the transactional server, the user can run the test that was just recorded to confirm proper operation. To add a verification steps or "checks" for the price and serial number, the user selects each field from the screen returned by the transactional server and enters an expected value for the field in a dialog box.

At this point, the test is configured for a single iteration which uses the title and author entered during the recording session. To supply data for additional iterations, the user parameterizes the title and author input steps and the two verification steps, and enters or imports additional rows of data values into the table. During execution, the first two columns of the spreadsheet would supply the input values (titles and authors) to be submitted to the web server, and the second two columns would provide the expected prices and serial numbers. If any of the verification steps fail, the testing tool would report a failure (as described below). In this manner, the bookseller can periodically select a random set of books to use as the data for the test by simply substituting the newly selected book information with the information in the appropriate columns of the spreadsheet.

VI. Correlation

Output parameters can be used for correlation by including the output value location, which indicates the source of the data, in a data spreadsheet such that a data value from a first screen is used in a second screen or another step of the same screen. In the SAP-based implementation, the output parameters are created in the results spreadsheet 402 as part of the output of the test. The output value that is parameterized can be used to correlate data to another screen of the business process or to another object within that screen. The output parameter spreadsheet location is entered in the input data sheet of the screen where the correlated data is used.

VII. Test Execution and Reports

When the test is played back to test a transactional server, the steps of the test are highlighted in the tree window 204 as the execution proceeds. The actual screens that are returned by the transactional server are provided in the screen capture window 206, including the data that is entered into fields of, and the data that is provided by, screens of the transactional server. Tests may optionally be executed in an unattended mode. FIG. 3A illustrates an example execution log that is generated by an SAP-based implementation of the testing tool. The execution log displays information regarding each step taken, such that the user can later review the results of the test. The execution log 302 provides, for each business process, such as a "va03" process" 304, the tasks that were performed by the user interface and data returned in response. For example, an "Order" step 306 involved two tasks; first, replacing the parameter "Order" with a value (step 308), and second, setting the object value to that of the parameter (step 310). As with the test, the execution log is preferably presented in the form of an expandable tree. In one embodiment, special status icons (e.g., a caution symbol) are used to indicate that an error, such as a failed verification step, occurred at lower level of the tree.

Figure 5E:
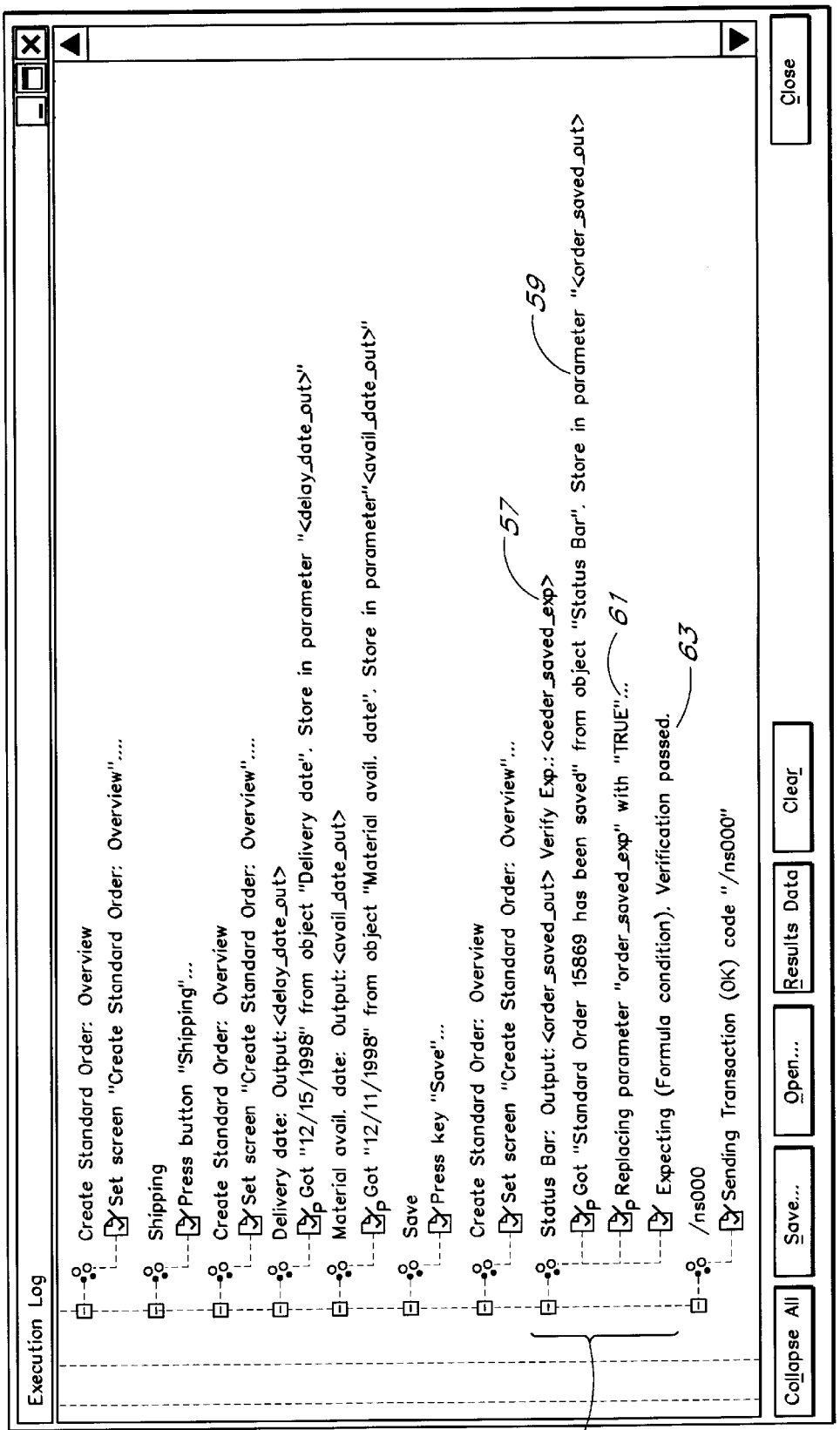
FIG. 5E illustrates an execution log that includes the steps taken in performing the verification steps provided by the data spreadsheet of FIGS. 5C and 5D.
Figure 5F:
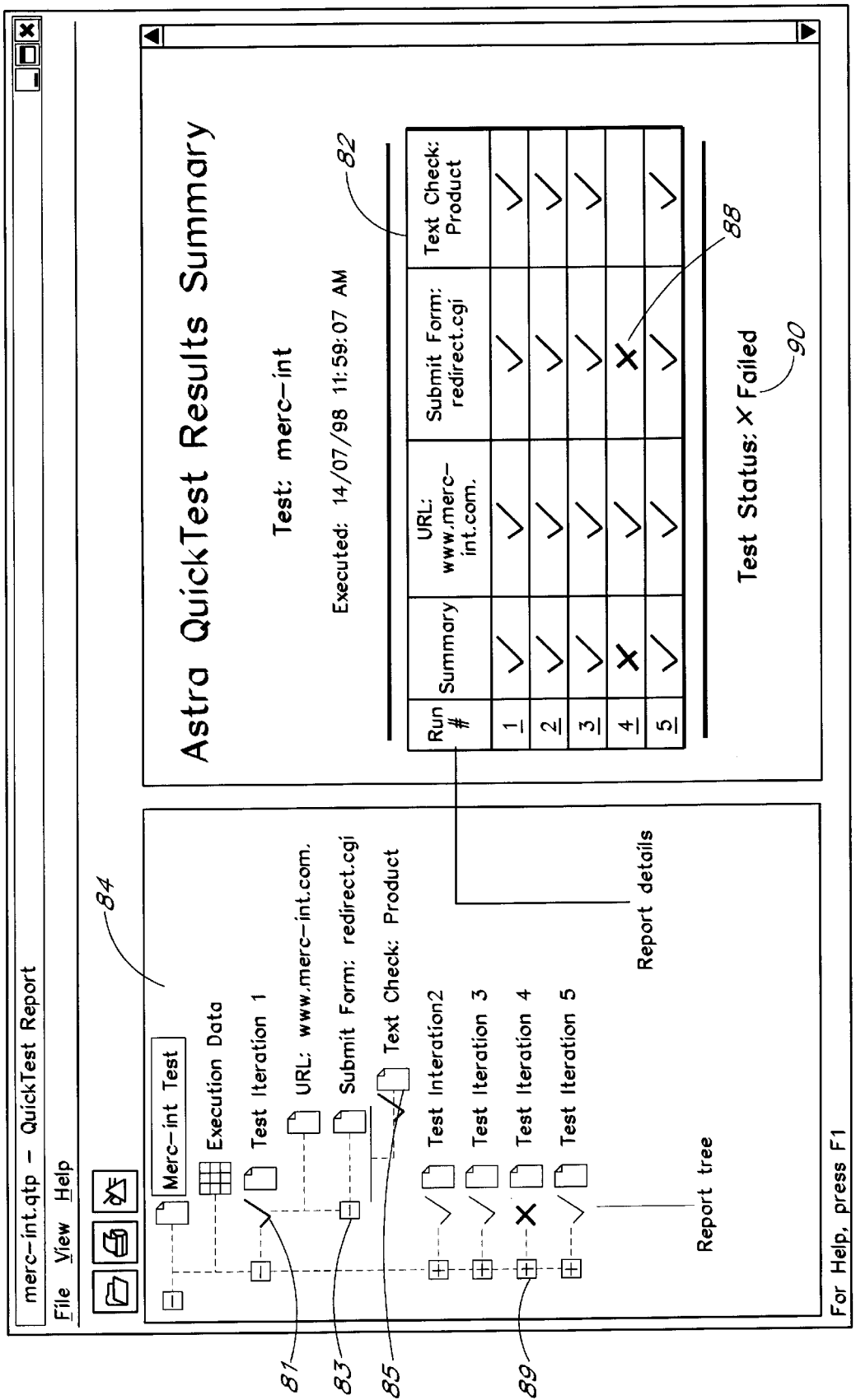
FIG. 5F illustrates an execution summary that is provided by a web-based implementation of the testing tool.

FIG. 5F illustrates the execution summary that is provided in a web-based implementation of the testing tool. The execution summary includes a tree representation 84 or "report tree" of the test execution in the left pane of the screen. Each iteration of the test and the associated steps are presented as nodes of the tree 84. For example, the first test iteration is represented by a first node 81, and details of this iteration can be viewed by expanding this node 81. Status data in the form of a green check mark or a red "X" indicates whether the step passed or failed. In the example shown, an "X" is displayed next to the icon of iteration #4, indicating that at least one step in iteration #4 failed. By expanding the iteration #4 node, the user can view the details of the failure. Any verification step within a screen is provided one level indented from the screen. (The process for creating verification steps is described separately below) For example, the text check 85 in the "Submit Form" screen 83 is indented by one level.

The right pane of the execution summary screen displays the report details (preferably as HTML pages) corresponding to the currently-selected node of the report tree. For example, when the user selects a URL icon, such as the icon labeled "www.mercint.com," the corresponding screen (web page) that was returned by the transactional server during test execution is displayed in the right pane.

When the user selects the root node of the tree a results summary page is displayed in the right pane as shown in FIG. 5F. The summary page includes the date/time of execution and a summary table 82. Each column in the table 82 corresponds to a screen request or a check, and each row of the table 82 corresponds to an iteration of the test. The cells of the table 82 contain a pass or fail mark to indicate the status of the request or check associated with the table column. As is illustrated by the table 82 of FIG. 5F, the fourth iteration of the test has failed. The failed iteration has a cross mark in its summary column 86. The specific screen where the failure occurred is identified by a cross mark in the appropriate column. In the example provided, the failure occurred in the redirect.cgi form submission row, and is indicated by an "X" in the corresponding cell 88 in the fourth row. When any iteration of the test has failed the overall test status is also provided as a fail status in the status statement 90.

Table 4 and 5 list the types of nodes that can appear in the report tree, and the corresponding report details provided in the right pane, for a preferred web-based implementation and a preferred mainframe implementation.

TABLE 4

EXECUTION LOG (WEB-BASED)

| REPORT TREE NODE | REPORT DETAILS DISPLAYED |
| --- | --- |
| Test Name | Result Summary - a summary of the web test results. This includes the test name, date and time of execution, and overall test status (succeeded or failed). It also includes a summary of each test iteration. |

TABLE 4-continued

EXECUTION LOG (WEB-BASED)

| REPORT TREE NODE | REPORT DETAILS DISPLAYED |
| --- | --- |
| Execution Data | Data table for the web test. Only applicable if the user parameterized test arguments. |
| Test Iteration | Execution summary for a specific test iteration. There is a test run iteration for every row of parameter values in the data table. |
| Test Step or Check | web page for the selected step or check in the web test. |

TABLE 5

EXECUTION LOG (MAINFRAME IMPLEMENTATION)

| REPORT TREE NODE | REPORT DETAILS DISPLAYED |
| --- | --- |
| Test Name | Quick Test Result Summary - a summary of the Year 2000 test results. This includes the test name, date and time of execution, and overall test status (succeeded or failed). It also includes a summary of each test iteration. |
| Execution Data | Data table for the test. Only applicable if the user parameterized the tests. |
| Test Iteration | Execution Summary for a specific test iteration. There is a test run for every row of parameter values in the data table. |
| Step | The terminal emulator screen for the selected step. A white highlight indicates an input field that was populated during test execution. |
| Text Check | If the text check was successful, it is highlighted in blue on the screen. If the text check failed, it is highlighted in red on the screen. A header above the screen details the expected result. |
| Full Screen Check | If the full screen check failed, the changed text is highlighted in red on the screen. Point to a highlighted area and a tool tip displays the expected result. |

The user interface of the testing tool provides various features for allowing the user to control the execution of a test. For example, when a "run from cursor" option is selected, the testing tool runs the entire test starting from the cursor position within the tree; when a "run to cursor" option is selected, the testing tool runs the test from the beginning (or from the step where execution was paused) to the cursor position; and when a "step over" option is selected, the testing tool executes the currently selected tree branch, moves to the next available step, and then stops. In addition, the user can limit execution to specific rows of data table 502. These and other execution options are particularly useful for debugging tests.

VIII. Formula Builder

One feature of the invention involves a formula builder which simplifies the task of defining formulas for verification. The formula builder is illustrated in FIG. SB, and is described in the QuickTest for R/3 User's Guide in the microfiche appendix. The formula builder dialog box includes a "use parameter" field 20, a "formula type" field 22, a "select word(s)" selection box 24, a "select search word(s) before" selection box 26, a "select search word(s) after" selection box 28, a formula view box 30, and a "result parameter" field 32. The "use parameter" field 20 identifies the parameter that will be parsed in selecting the string that is compared to the expected value. The "formula type" field 22 identifies the formula type that is defined in the dialog box, such as an "exact word(s)" formula, a "search for text with wildcards" formula, etc. The "select word(s)" selection box 24, "select search word(s) before" selection box 26, and "select search word(s) after" selection box 28 are specific objects of the "exact word" formula builder. Other formula builders will include different objects, as may be required for the particular formula building operation. The selection boxes 24, 26, 28, define the text that is compared to the "result parameter," in the specific case of an "exact word" formula. The formula view box 30 displays the textual formula that the formula builder inserts to the data spreadsheet to create the text for the comparison. The "result parameter" field 32 is the identifier for the string to which the result of the formula is compared.

FIGS. 5C and 5D illustrate data spreadsheets that are associated with the formula constructed in the illustrated formula builder of FIG. SB. The formula is a dynamic verification that searches for a text string with any term between two segments of the text string. The formula is inserted into the expected cell of the spreadsheet that is used to define the expected string to be received from the transactional server. The output string in the "order_saved_out" cell is parsed to determine whether the condition defined in the expected cell is satisfied. In FIG. 5C, the output value in the "order_saved_out" cell is an expected string. Thus, the cell containing the formula provides a "TRUE" value. In FIG. 5D, the output value in the "order_saved_out" cell includes as the last term the word "save" instead of the expected "saved." Thus, the cell containing the formula provides a "#VALUE" indicating failure of the verification. FIG. 5E illustrates an execution log that contains execution steps that correspond to the verification step defined by the formula builder of FIG. SB and stored in the expected cell of the corresponding data spreadsheet illustrated in FIGS. 5C and 5D. In the execution log, the illustrated verification begins at the step labeled "Status Bar," (step 57) where an output and verify expression are identified. The next statement (step 59) provides that the output of the transactional server for the identified object was stored as an output parameter. Next, the expected parameter was compared to the stored parameter to arrive at the verification result, which is "TRUE" in the example provided (step 61). The final execution log step (step 63), associated with the illustrated verification, is to provide the result of the verification to the execution log in the form of a "verification passed" statement. As may be appreciated, every step of the execution log that is successfully completed has a check mark as part of the corresponding icon. Steps that are not successfully completed have a cross mark as part of the associated icon.

IX. Loon Objects

The testing tool preferably allows the user to data drive business processes having tables or loop objects (i.e., repeating input fields). FIG. 3B illustrates the testing tool screen with a loop object in the server capture window. The loop object of FIG. 3B is a table of items used in an "order" screen. The loop object is associated with a node of the tree window. The node for the loop object includes a loop object icon and a textual title for the loop object. In the example of FIG. 3B, the title for the table is "All_items." The loop object is designated as a parameter object because the input values to the loop object are provided from a data file, preferably in the form of a spreadsheet. The user can use a separate spreadsheet for each loop object that has to be data driven. In addition, the user can define a different size data set for each iteration of the test. For example, for a first iteration the user may wish to enter three sets of data into a table and for a second iteration the user may wish to enter two sets of data into a table. The reason for using different size data sets may be because, for example, different number of items are entered into an item table for an order form.

FIG. 3C illustrates the data spreadsheet for the loop object of FIG. 3B. The data spreadsheet for the loop object employs a marker that is placed in the first column at the last row of a data set for a specific iteration. For example, the marker "End 1" in the data spreadsheet indicates the end of the first data set, and the marker "End 4" indicates the end of the fourth data set. In this manner, the marker is used to identify the position of the last set of data for the object during the particular iteration. When the test is executed, the testing tool will use data from the spreadsheet until the marker is reached. Additionally, data can be imported into the spreadsheet and separated by the marker to indicate a set of data for a specific iteration. The process taken in providing data to loop objects of the transactional server screens is illustrated below with reference to FIG. 10.

X. Expert Mode

As described above, the testing tool provides a simple and convenient interface for recording and editing tests so that any user, including business people and other non-technical personnel, can design tests. To facilitate low-level editing of tests by skilled programmers, the testing tool also preferably provides and "expert mode." The expert mode allows the user to view the textual testscript and make modifications to the text. The user can thereby create functions and queries that may not be part of the automated features of the test to provide a higher level of test customization.

XI. Views

The testing tool allows the user to define multiple views or subset selections of business processes from a test that includes multiple business processes. To define a view, the user selects from the business processes that are part of the test. Any number of business processes can be included in a view. The execution order of the business processes can be modified when the view is defined. As may be appreciated, to create several different scenarios which include business processes, the user only has to record one test that includes the various business processes. From a single recorded user session, a number of test scenarios can be defined by using the views feature of the testing tool. The views that are defined by the user are preferably stored in a views file that contains the views that are associated with a test. Further, an execution log file is associated with each view of the test. The same views file is preferably accessible to the optional LoadRunner module, when load-testing a transactional server, so as to identify the business processes associated with a view provided to the input of the LoadRunner module.

XII. Software Architecture and Flows

The various user interface features and testing methods described above can be implemented through conventional programming methods that are well known in the art. One example of a set of software components and methods which may be used will now be described with reference to FIGS. 6A–10. The implementation set forth in these Figures corresponds generally to the SAP-based implementation described above, but is also generally applicable to other types of transactional servers.

Figure 6A:
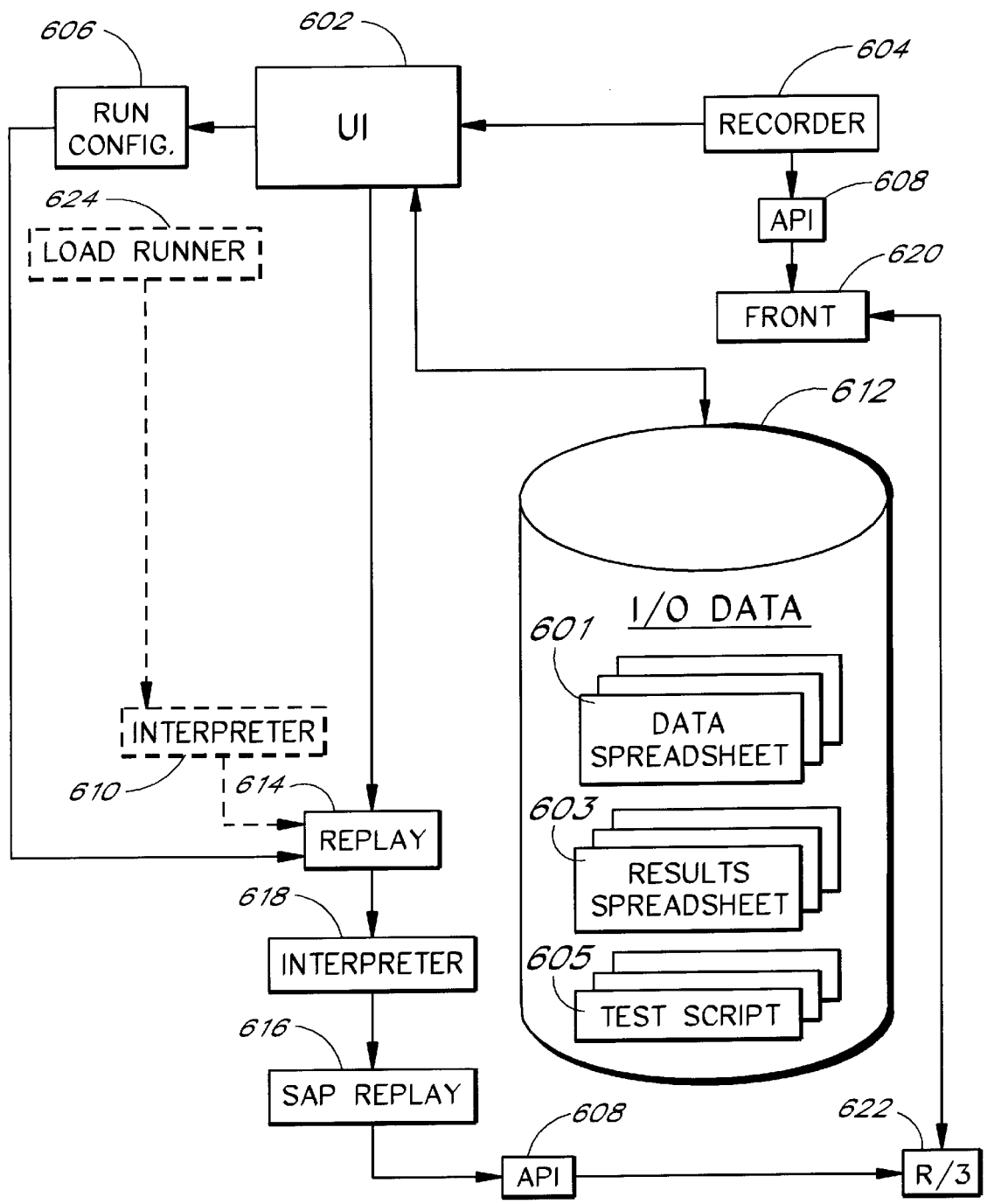
FIG. 6A illustrates an arrangement of the components associated with an SAP-based implementation of the testing tool.

FIG. 6A illustrates the arrangement of the functional components associated with the testing tool. The components can be categorized as data sources, replay and recording modules, and interface modules. The data sources associated with the testing tool are an Input/Output (I/O) data library 612, and a run configuration library 606. The replay and recording modules associated with the testing tool are a load-testing interpreter 610, a load-testing module 624 (both optional), a replay module 614, an SAP replay library 616, a replay interpreter 618, and a recorder 604. The interface modules associated with the testing tool are a user interface 602, and an Application Program Interface (API) 608.

Figure 7:
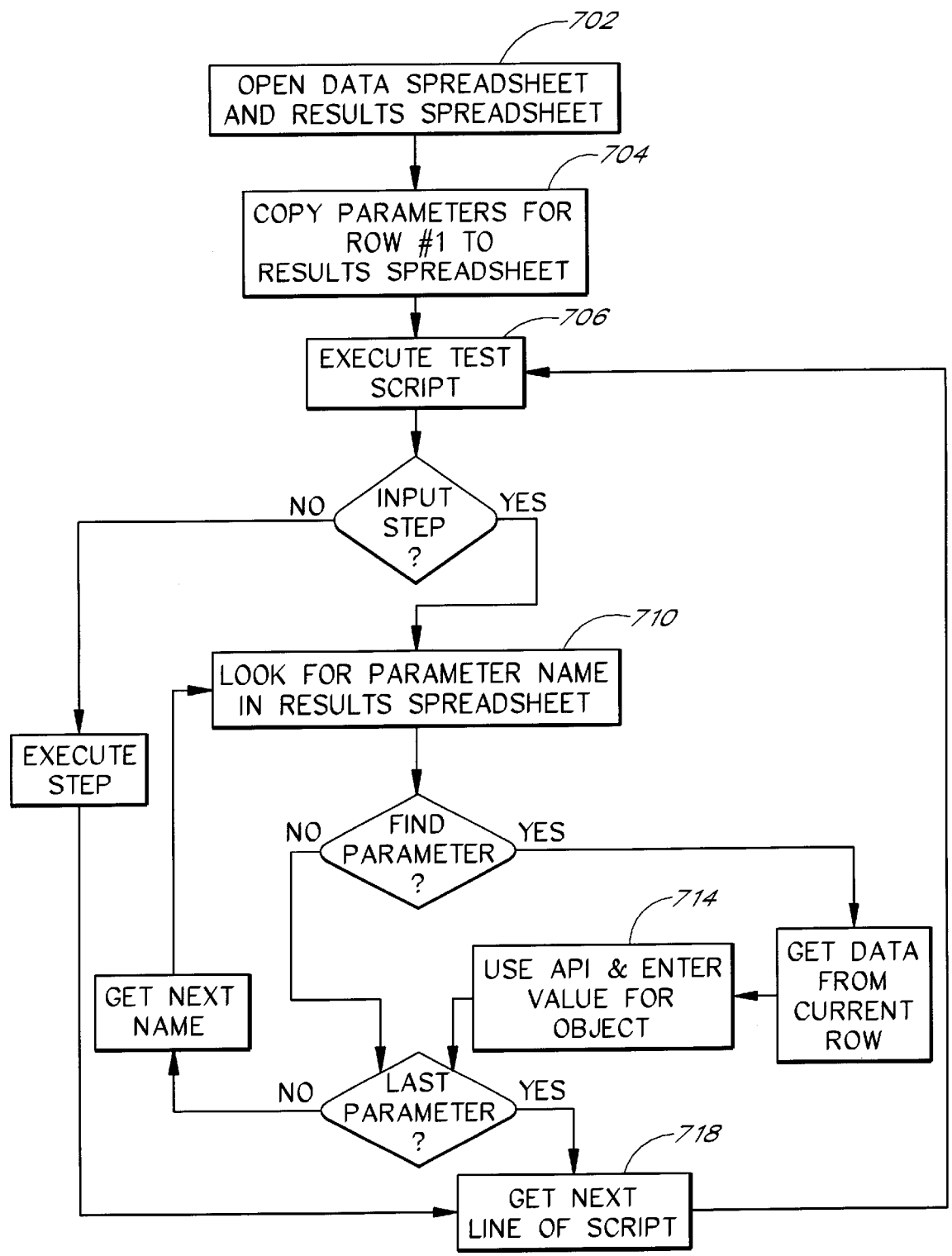
FIG. 7 illustrates the steps taken by the test replay portion of the testing tool of the present invention.

The load-testing Interpreter 610 is responsible for sending commands to the replay module 614 to simultaneously execute several testcases so as to test the load capabilities of the transactional server. (The term "testcase" refers generally to a test and any associated data tables.) The load-testing interpreter 610 is associated with the load-testing module 624 to allow for the replay module in 614 to execute commands of the load-testing script. The load-testing interpreter 610 is associated with a user interface 602 to allow the user to control the operation of the interpreter 610. Both the load-testing module 624 and the load-testing interpreter 610 are available from the assignee's commercially available LoadRunner® product. The replay module 614 is responsible for setting up the replaying of a testcase. The replay module 614 is associated with the user interface 602 to allow the user to control the replaying of the testcase. The replay module 614 sets up the data files for a testcase and controls the execution. The data files are created when the user records a business process. The data files are then modified as the user refines the recorded business process by using the testing tool. The replay module 614 further reads data from the I/O data library 612 as may be requested by the SAP replay functions that are called by the replay interpreter 618. The replay interpreter 618 is responsible for parsing a testscript and calling the identified functions along with the associated data locations that are provided by the testscript (FIG. 7). The SAP replay functions use an API 608 to send information to the SAP server. Specifically, in the SAP version of the testing tool, the GUILIB set of functions that is provided by SAP is used to communicated with the SAP server. The SAP replay library 616 includes the functions associated with the transactional server testing features of the testing tool. The results of the interaction between the API 608 and the server are displayed in the server screen capture window 206.

A recorder module 604 is used to record the business process steps by monitoring the user interface 602 and the front end 620 during a user session. The recorder module 604 performs the monitoring by intercepting API 608 function calls during the user session. By monitoring the API function calls, the testing tool gathers information regarding the objects sent by the user interface 602 or returned by the front end 620. The GUI objects that are passed between the user interface 603 and the front end 620 are in the form of C structures that include objects and associated properties. The recorder module 604 saves the C structures that include the objects in a file that is associated with the particular sequence of user steps.

The information from the API function calls is used to generate nodes of a tree that represents the user session. Each node in the tree is generated when a GUI structure is passed to or from the transactional server 622. The nodes are added to the tree and, as described above, are displayed as the recording proceeds. The nodes are saved in the form of a testscript when the user completes the editing of the test or saves the session. Each node may include features that are specific to the node and not relevant to other nodes. For example, a data entry node includes the object identifier and the data to be entered while a key press node includes only an object identifier. Thus, when converting the tree to a testscript, some overhead can be saved by not having to parse each node to determine node type followed by performing operations specific for the node type to convert the node to a testscript line. Because the nodes of the tree are preferably class objects (discussed below), each object can be associated with particular functions, specific to the object, that enable the conversion of the object to a testscript line. Therefore, to convert the tree nodes to lines of a testscript, the testing tool simply instructs the nodes to call their own functions to convert the nodes to lines of the testscript. Each line of the resulting testscript preferably includes a single function call and the data references associated with the function call. Alternatively, the testscript can be generated during the recording session by converting the intercepted protocol level requests to lines of the testscript. The tree nodes can then be generated when the user wishes to view the testscript by converting the testscript to a tree as is done when loading a saved testscript. A sample testscript for one business process of a testcase is provided in Appendix A.

The I/O data library 612 contains testscript files 605, the data spreadsheets 601 (data tables), and the results spreadsheets 603 for the various testcases. As indicated above, the spreadsheets are preferably stored as .XLS or other standard-format spreadsheet files. The run configuration library 606 includes information regarding program settings that are used by the LoadRunner interpreter 610, the replay interpreter 618, and the user interface 602 to control the execution of the test.

Figure 6B:
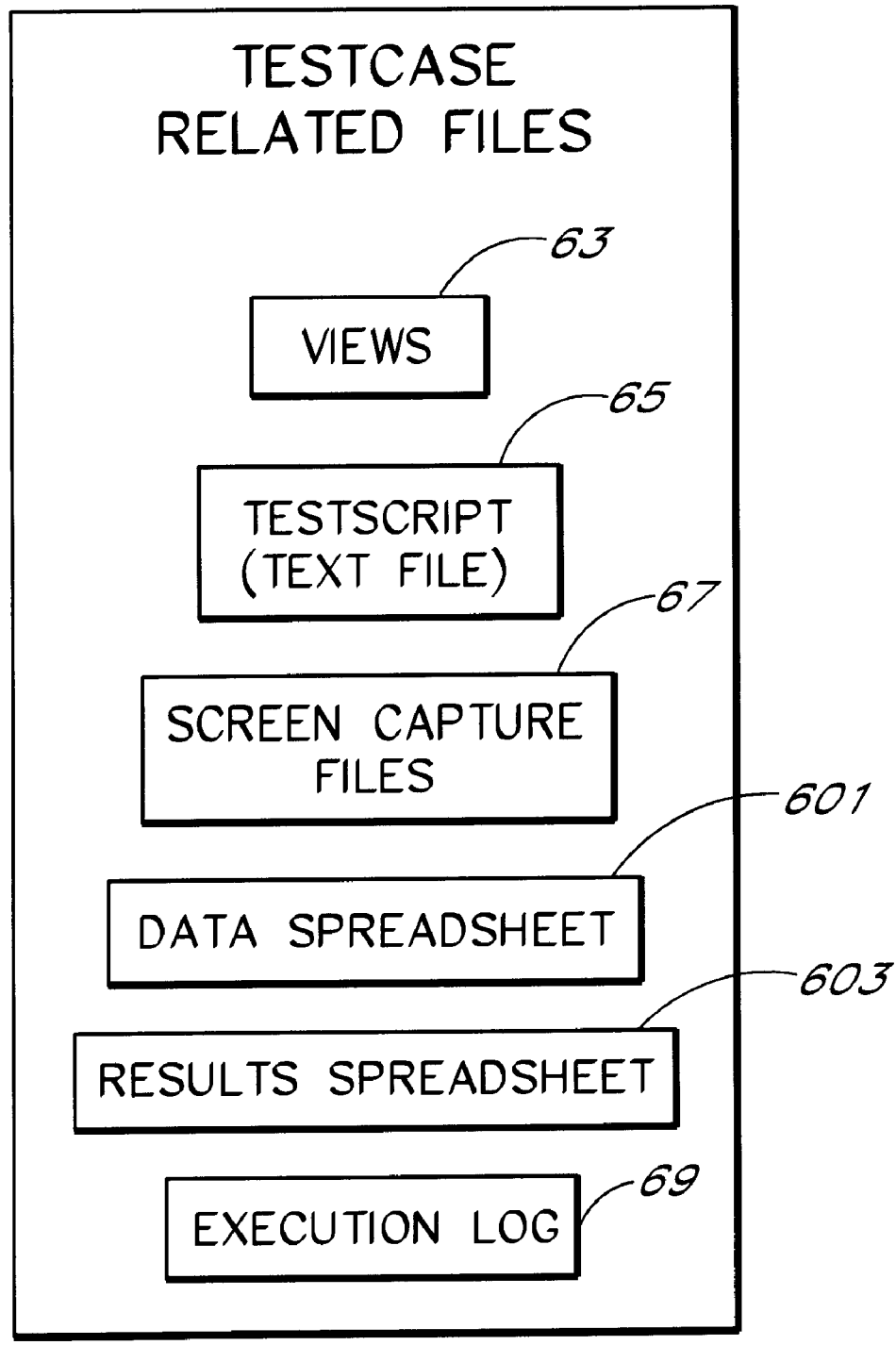
FIG. 6B illustrates the files that are associated with a test.

FIG. 6B illustrates the data files that are preferably associated with each testcase. A testscript file 65 contains a testscript representation of the test. A View file 63 includes the views that are defined for a particular testcase. Screen capture files 67 contain the server screens returned during the recording process (preferably stored as object sets), and include server screens captured during the most recent execution of the test. A data spreadsheet 601 contains data values for parameterized variables, as described above. A results spreadsheet 603 contains results for the most recent execution of the testcase, as described above. Finally, an execution log 69 stores additional results of the most recent test execution, and is used to generate and display the results tree.

Figure 6C:
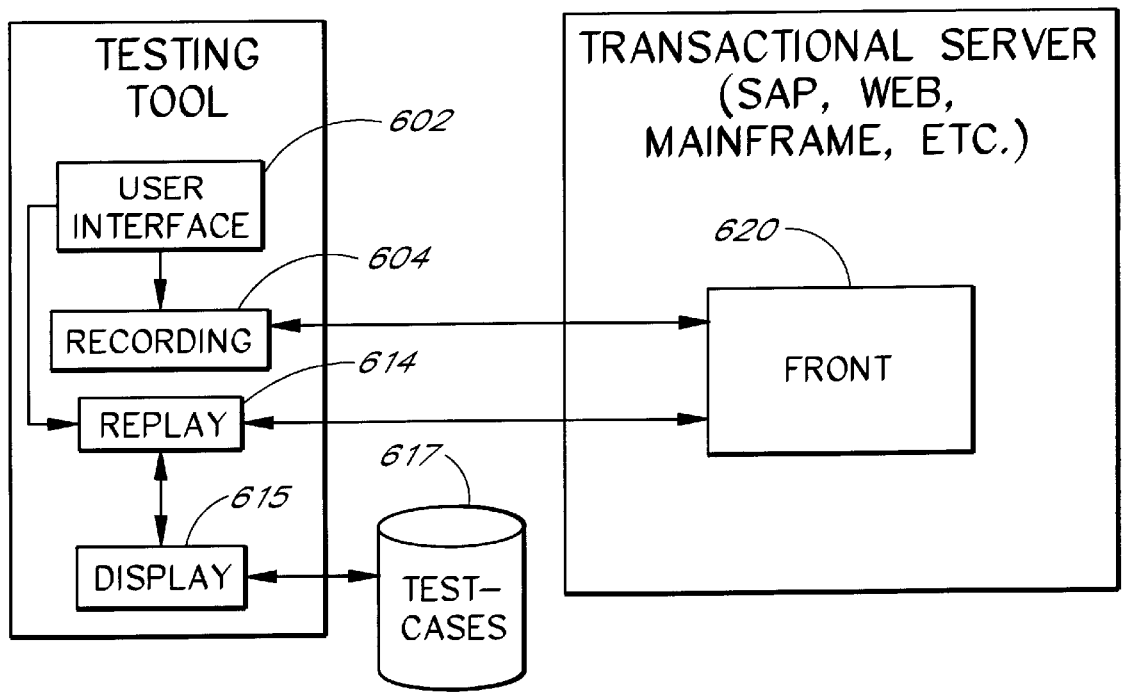
FIG. 6C illustrates an arrangement of a testing tool, associated components, and a transactional server under test.

FIG. 6C is another illustration of a testing arrangement in accordance with the present invention. The arrangement includes a user interface 602, a recording module 604, a replay module 614, a display module 615, a library 617 of testcases that includes associated data, and a transactional server front (front) 620. The user interface is associated with the recording module 604 and the replay module 614 to allow the testing tool to record the user actions and to allow the user to control the test execution as discussed above with reference to FIG. 6A. The recording module intercepts protocol level requests between the user interface 602, the display module 615, and front 620 to generate the testcase. The replay module 614 interacts with the front 620 to send commands to the transactional server in accordance with the testcase that is selected by the user.

FIG. 7 illustrates the process of retrieving and entering data for an input parameter. In the embodiment shown in FIG. 7 and the subsequent flow diagrams, it is assumed that an SAP-based transactional server is being tested. It should be understood, however, that the illustrated methods may also be used with other types of transactional servers. As is illustrated by FIG. 7, the testing tool initializes the spreadsheets that are associated with the test before starting to execute the testscript.

The data spreadsheet 601 and the results spreadsheet 603 are opened in the first step 702 of the initialization. The data for the first iteration of the testcase are then copied from the first row of the data spreadsheet 601 to the first row of the results spreadsheet 603 (step 704). The data are copied to the results spreadsheet 603, allowing the testing tool to read from and write to a single spreadsheet file during execution. Once the results spreadsheet 603 is initialized, the data are ready to drive the execution of a first iteration of the testcase.

The testing tool starts executing the testscript (step 706) by parsing the first line of the testscript. The interpreter 618 searches for the testscript command in its local function library. If the command is not in the interpreter's local library, the SAP function library 616 is accessed to retrieve the function that performs the command. If the command is an input step that requires data from a parameter to be used for the input field of the transactional server, the testing tool proceeds to retrieve the associated value from the results spreadsheet 603. The testing tool searches for the parameter in the results spreadsheet (step 708). If the parameter is found, the testing tool retrieves the data for the current row of the spreadsheet (step 710). If the parameter is not found, the name of the parameter, in the form of a text string, is used as the data for the input filed. Once the data is retrieved, the testing tool reads the value of the spreadsheet cell, including formatting information, and sends the value to the transactional server using the SAP function library 616 (step 714). When there are no more object values to be sent to the transactional server in the current command of the testscript, the testing tool retrieves and parses the next line of the testscript (step 718). The remaining lines of the testscript are executed in a similar fashion.

As the testscript lines are executed, the screens returned by the transactional servers are preferably stored for subsequent viewing, and the execution results (e.g., results of verification steps) are written to the execution log and the results spreadsheet, as appropriate. The test results may alternatively be buffered in memory, and written to the appropriate file(s) only after the test has completed. In one embodiment, the execution log is generated and displayed during the execution process. When the end of the testscript is reached, the testing tool checks to see whether another row of data is available in the data spreadsheet 502. If another row of data is available, the testing tool appends the data to the results spreadsheet 402 and executes the testscript from the start.

Figure 8:
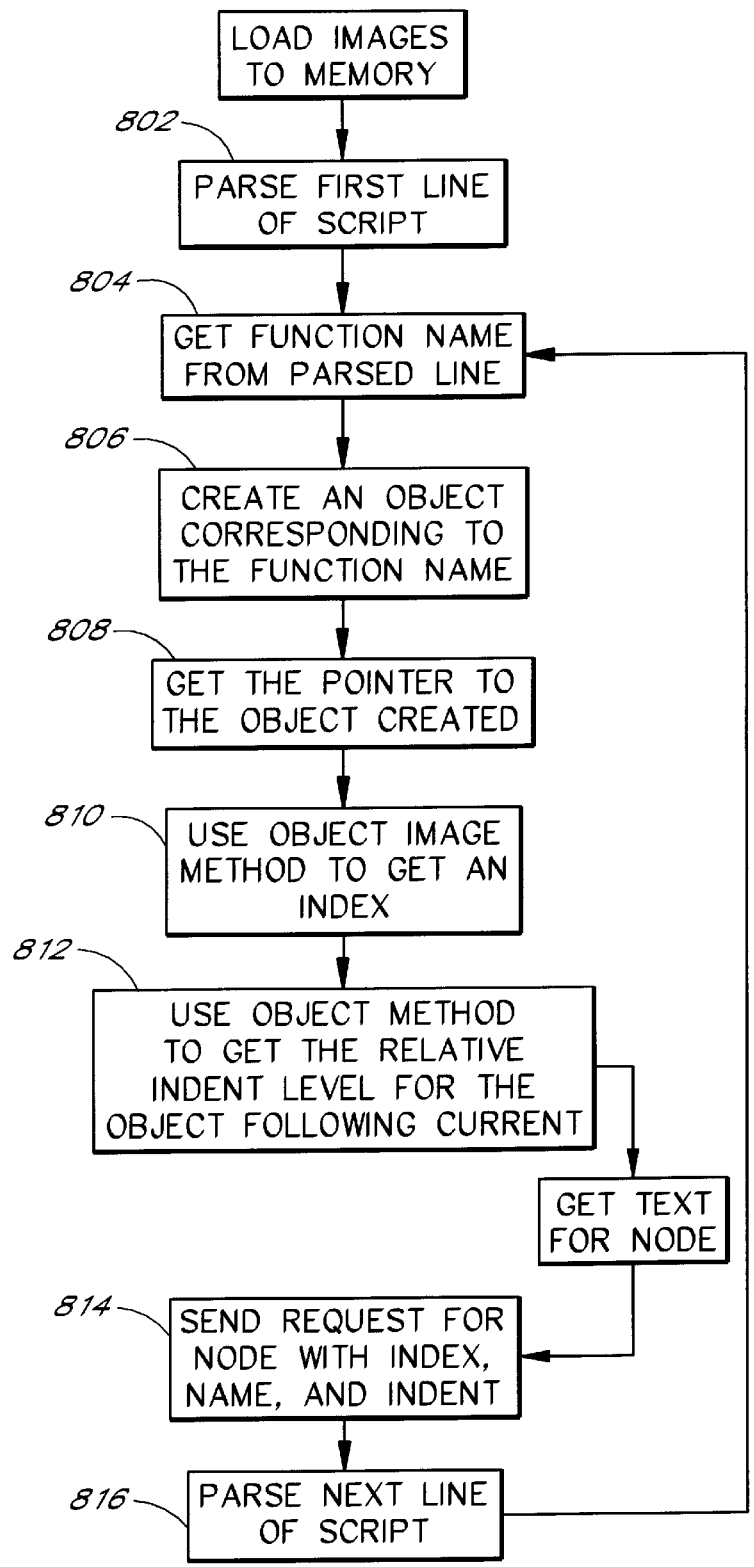
FIG. 8 illustrates the steps taken by the icon display portion of the testing tool.

FIG. 8 illustrates the steps taken in displaying the testscript as icons in the tree window of the testing tool screen. The testing tool converts the testscript to a tree representation whenever the user opens a saved testcase. The testing tool displays the testscript as icons of the tree representation by (1) parsing each individual line of the associated testscript, (2) identifying the function performed by the line, (3) identifying the properties associated with the function, and (4) creating an icon with the identified properties in the tree window. The testing tool uses well known line parsing routines such as AWK to parse the lines of the testscript and identify the function names. A similar process may be used to generate the results tree from the execution log.

The testing tool initially copies all the images that can appear in the icons of the tree to memory. The index of each image in memory is known by the testing tool. The testing tool then parses the first line of the testscript (step 802). The function name is retrieved from the parsed line (step 804). An object is then created by calling a function that creates objects such as C++ objects by reference to an object class (step 806). The testing tool defines a class for each function name available to the testscript. In this manner there is always a class associated with a function name.

In step 808, the testing tool receives a pointer to the object that was created. The object contains, in addition to the information regarding the graphical representation of the function, attributes that are particular to the function that was converted to a node. For example, the object may include the name of the field of the transactional server, the value that is to be entered to the field of the transactional server, and other information that is relevant to the step of the tree. The image method of the object is then used to retrieve an image index for the object (step 810). The testing tool uses the indent method of the object to retrieve a relative indentation level for the object following the object (step 812). The text that is associated with the node is also retrieved from the object (step 813). A request is then sent to the user interface to insert a node in the tree window that includes an icon with the image index, the node text and the relative indent level that were retrieved (step 814). The node of the tree further includes all the properties that are associated with the function, including the object name, field values, and other relevant data. After requesting the node creation, the testing tool continues by parsing the next line of the testscript (step 816). When the user edits a testcase, the changes to the steps are preferably saved as part of the properties of the tree nodes as opposed to being saved directly into the testscript.

The testing tool associates each node of the tree with a relative indent level as opposed to an absolute indent level so as to provide for the fast and simple editing of testcases. The relative indent level enables the test user to move steps from one location in the tree to another, by dragging and dropping, for example, without the need to worry about the indent level of the step or the interaction between the step and other steps of the testcase. The relative indent associated with a node is of the node to follow, as opposed to the indent level of the node itself. By employing an indent level to follow, the testing tool provides for the complete portability of steps because the logical indent level of a step is generally dictated by the step preceding it.

Figure 9:
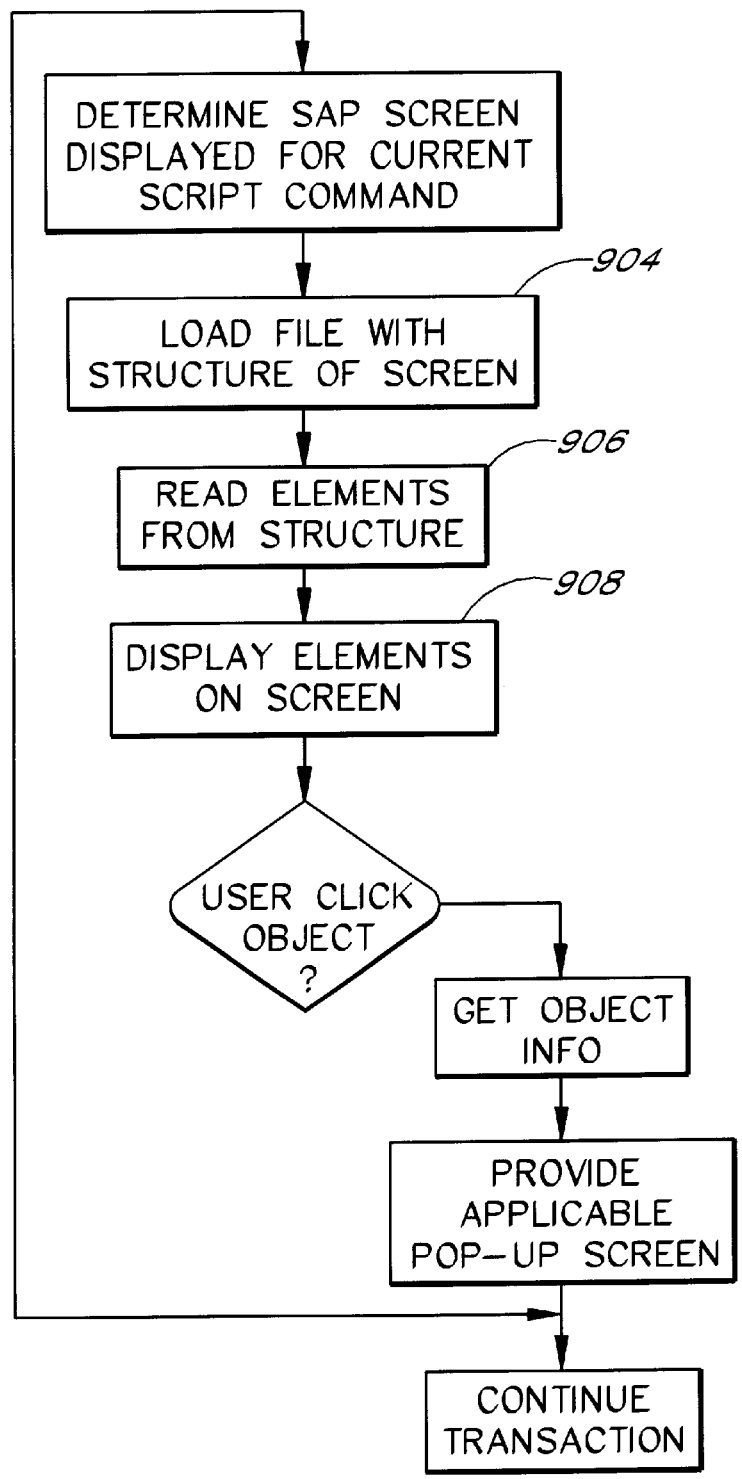
FIG. 9 illustrates the steps taken by the transactional server screen display portion of the testing tool.

FIG. 9 illustrates the steps taken by the testing tool when displaying the screens in an active format. To display a screen, the testing tool stores the sets of objects passed by the transactional server to the API by saving the structure containing the objects. When displaying the screen associated with a step of the testcase, the testing tool refers back to the saved structure containing the object of the associated screen (step 904). The elements of the GUI are then read from the structure (step 906). The elements are displayed in the screen capture window (step 908). If the user clicks on an object of the screen, the testing tool first determines the object that was selected and its associated type (step 912), and in one embodiment, highlights any corresponding node within the tree. If the user right-clicked on the object, the testing tool also provides a pop-up screen that is applicable to the object selected by the user (step 913). For example, if an input field is selected, the user is provided with a pop-up screen that may be associated with entering data for a field. On the other hand, if a text display is selected, the user is provided with a pop-up screen that may be associated with selecting text for verification. In this manner the testing tool automatically provides a proper (context sensitive) pop-up screen in response to user selections from the screen. The process for highlighting screen objects in response to node selections is analogous to that shown in FIG. 9.

Figure 10:
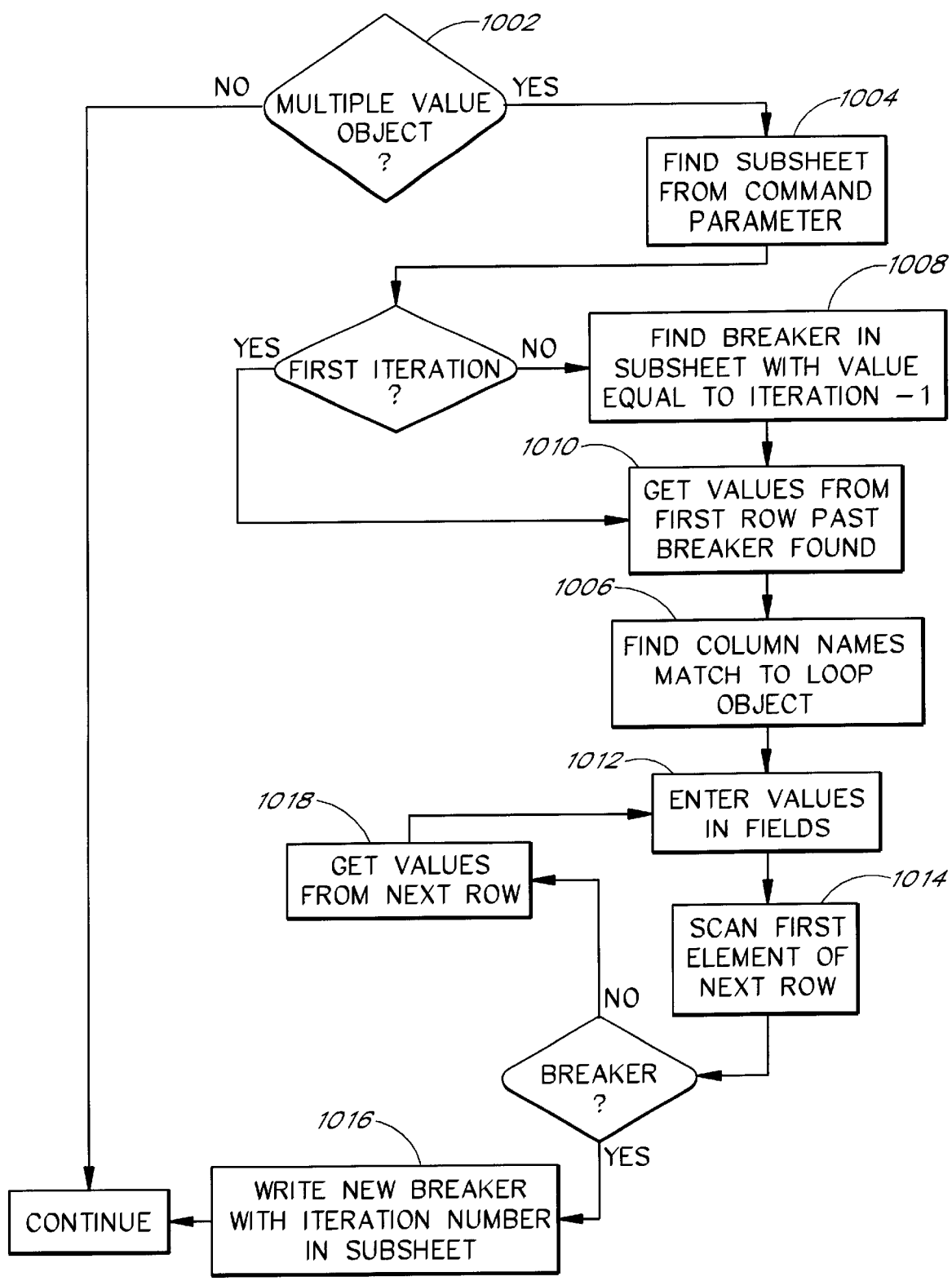
FIG. 10 illustrates the steps taken by the data entry portion of the testing tool during a replay of a test that includes loop objects.

FIG. 10 illustrates the steps associated with entering values for a loop object of the transactional server. The testing tool first determines whether the command from the testscript is for entering data to a loop object (step 1002). If the command is for entering multiple data sets, the spreadsheet where the data sets are stored is identified from the parameters of the command in the testscript (step 1004). During the data driving step 108 of the testcase development, the user created a separate spreadsheet with the multiple data sets, which optionally includes breaker entries (as described above). The spreadsheet name was saved during the recording session, along with other information associated with the tree node. For the first iteration of the testcase, the testing tool immediately starts sending data from the spreadsheet to the transactional server. After the first iteration, the breaker with an iteration number that is one less than the number of the current iteration of the testcase is located before data is sent (step 1008). The testing tool preferably sends the data between the located breaker and the following breaker. When data is sent, the testing tool first matches the fields from the subsheet to the column heading in the loop object of the transactional server (step 1006). The values from the first row are then retrieved (step 1010). The values that are retrieved are sent to the server (step 1012) by using the API 608. Next, the testing tool checks the first element of the next row (step 1014). If the element is a breaker, the testing tool proceeds to replace the breaker with a new breaker value with the current iteration number to the subsheet (step 1016). The testing tool then continues the execution of the testcase by reading the next command from the testscript. If the element is not a breaker, the testing tool retrieves the data set from the row and moves to send the data to the server as was done for the previous row in steps 1010 and 1012.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. A method for testing a transactional server, comprising the computer-implemented steps of:

generating a test which is adapted to be run to test functionality of the transactional server, the step of generating the test comprising (a) recording data input steps by a user as the user interacts with the transactional server to perform a transaction, and (b) recording verification steps specified by the user to test for expected responses from the server;

presenting a data table to the user to permit the user to specify multiple data sets to be used to test the transaction;

recording a plurality of data sets specified by the user with the data table, the data sets including data values for executing at least some of the data input steps and verification steps; and running multiple iterations of the test using different data sets of the plurality for different iterations.

2. The method as in claim 1, wherein the data table is a spreadsheet.

3. The method as in claim 2, wherein the spreadsheet is a standard-format spreadsheet.

4. The method as in claim 2, wherein each row of the spreadsheet corresponds to a respective iteration of the test.

5. The method as in claim 2, wherein each column of the spreadsheet corresponds to a parameterized step of the test.

6. The method as in claim 5, further comprising presenting the user an option to specify a subset of steps to be parameterized.

7. The method as in claim 2, further comprising presenting the user an option to insert markers within the spreadsheet to define data set boundaries, to thereby permit the user to define variable-length data sets.

8. The method as in claim 1, further comprising representing the test to the user as a hierarchical node structure in which nodes represent corresponding steps of the test.

9. The method as in claim 1, wherein running multiple iterations of the test comprises storing data values returned by the transactional server in a results spreadsheet.

10. The method as in claim 9, further comprising storing results of at least one verification step within the results spreadsheet.

11. A method for testing a transactional server, comprising the computer-implemented steps of:

generating a test which is adapted to be run to test functionality of the transactional server, the test including data input steps and data verification steps, the verification steps specifying expected responses from the transactional server;

reading a plurality of data sets from a spreadsheet, the data sets including data values for executing at least some of the data input and data verification steps; and running multiple iterations of the test using different data sets of the plurality for different iterations.

12. The method as in claim 11, wherein each row of the spreadsheet corresponds to a respective iteration of the test.

13. The method as in claim 12, wherein each column of the spreadsheet corresponds to a parameterized step of the test.

14. The method as in claim 11, further comprising providing user access to the spreadsheet through a user interface of a testing tool used to generate and run the test.

15. The method as in claim 11, wherein the spreadsheet is a standard-format spreadsheet.

16. The method as in claim 11, wherein running multiple iterations of the test comprises storing data values returned by the transactional server in a results spreadsheet.

17. A software system for testing the functionality of a transactional server, comprising, stored on a computer-readable medium:

a first program module which records user interactions with a transactional server, including data values entered into screens of the transactional server, to generate a test that is adapted to be played to test the transactional server;

a second program module which provides a data table for specifying multiple data sets to be used for running multiple iterations of the test, wherein the data sets include values to be entered into the screens of the transactional server during execution of the test, and different data sets correspond to different test iterations; and a third program module which uses the data sets specified within the data table to run multiple iterations of the test.

18. The software system as in claim 17, wherein the first program module further records verification steps defined by the user to test data values returned by the transactional server, and data table stores data values for executing the verification steps.

19. The software system as in claim 17, wherein the data table is a spreadsheet.

20. The software system as in claim 19, wherein the second program module stores each data set in a separate row of the spreadsheet.

21. The software system as in claim 17, wherein the third program module stores results of test execution in a results spreadsheet.

22. The software system as in claim 17, wherein the first program module displays the test to the user as a hierarchical node structure in which steps of the test are represented by corresponding nodes.

23. The software system as in claim 22, wherein the first program module responds to user selection of a node that corresponds to a data input field by displaying a captured screen with the data input field highlighted.

* * * * *